United States Patent
Hidaka et al.

(10) Patent No.: US 8,082,768 B2
(45) Date of Patent: Dec. 27, 2011

(54) PIERCING AND ROLLING PLUG, METHOD OF REGENERATING SUCH PIERCING AND ROLLING PLUG, AND EQUIPMENT LINE FOR REGENERATING SUCH PIERCING AND ROLLING PLUG

(75) Inventors: Yasuyoshi Hidaka, Hyogo (JP); Kazuhiro Shimoda, Hyogo (JP); Kouji Nakaike, Wakayama (JP); Naoya Hirase, Wakayama (JP); Yasuto Higashida, Hyogo (JP); Takateru Inage, Wakayama (JP); Jyun Nagakita, Wakayama (JP); Masaharu Nakamori, Hyogo (JP); Fumihito Yoshikawa, Hyogo (JP); Yoshihiko Hayashi, Hyogo (JP); Takayuki Aisaka, Hyogo (JP)

(73) Assignee: Sumitomo Metal Industries, Ltd., Osaka-shi (JP)

( * ) Notice: Subject to any disclaimer, the term of this patent is extended or adjusted under 35 U.S.C. 154(b) by 0 days.

(21) Appl. No.: 12/490,857

(22) Filed: Jun. 24, 2009

(65) Prior Publication Data

US 2010/0050723 A1    Mar. 4, 2010

Related U.S. Application Data

(63) Continuation of application No. PCT/JP2008/068950, filed on Oct. 20, 2008.

(30) Foreign Application Priority Data

Nov. 1, 2007 (JP) ................................. 2007-285382
Jun. 10, 2008 (JP) ................................. 2008-151662

(51) Int. Cl.
*B21B 19/04* (2006.01)

(52) U.S. Cl. .................................. 72/97; 72/47; 72/209
(58) Field of Classification Search ................ 72/46, 47, 72/97, 208, 209, 476; 427/142, 256, 287, 427/299, 427.3, 580; 428/547, 548, 469, 428/471

See application file for complete search history.

(56) References Cited

U.S. PATENT DOCUMENTS 4,110,512 A * 8/1978 Roy et al. ...................... 428/469
(Continued)

FOREIGN PATENT DOCUMENTS

GB    2069904 A    9/1981
(Continued)

OTHER PUBLICATIONS

International Search Report in corresponding PCT/JP2008/068950 dated Jan. 13, 2009.

(Continued)

*Primary Examiner* — Edward Tolan
(74) *Attorney, Agent, or Firm* — Marshall, Gerstein & Borun LLP

(57) ABSTRACT

A piercing and rolling plug has a film composed of oxides such as $Fe_3O_4$ and FeO and Fe (metal) as being formed on the surface of the base metal by electric arc spraying using an iron wire whose main component is Fe and, owing to this film, a plug excellent in heat-shielding and seizure-preventing effects can be realized and the lifetime of the plug can be prolonged. Further, in regenerating this plug, a film can be re-formed via the steps of shot blasting of the as-used plug in piercing and rolling and electric arc spraying in that order; thus, it is possible to regenerate the plug at low cost and in a short period of time.

20 Claims, 13 Drawing Sheets

U.S. PATENT DOCUMENTS

| | | | |
|---|---|---|---|
| 4,348,241 A * | 9/1982 | Kunioka et al. | 428/472.2 |
| 4,393,677 A | 7/1983 | Tamura et al. | |
| 4,451,496 A * | 5/1984 | Gedwill et al. | 427/456 |
| 5,004,886 A * | 4/1991 | Born et al. | 219/76.14 |
| 5,077,137 A * | 12/1991 | Molnar | 428/601 |
| 5,332,628 A * | 7/1994 | Drossman | 428/558 |
| 5,932,293 A * | 8/1999 | Belashchenko et al. | 427/446 |
| 5,958,521 A * | 9/1999 | Zaluzec et al. | 427/449 |
| 6,210,806 B1 * | 4/2001 | Hidaka et al. | 428/469 |
| 6,329,021 B1 | 12/2001 | Haug et al. | |
| 6,521,115 B2 * | 2/2003 | Duruz et al. | 205/387 |
| 6,858,116 B2 * | 2/2005 | Okabe et al. | 204/192.12 |
| 6,863,931 B2 * | 3/2005 | Someno et al. | 427/456 |
| 6,902,768 B2 * | 6/2005 | Smith et al. | 427/449 |
| 7,341,758 B2 * | 3/2008 | Stewart et al. | 427/8 |
| 7,383,710 B2 * | 6/2008 | Yamakawa et al. | 72/97 |
| 7,482,065 B2 * | 1/2009 | Branagan | 428/635 |
| 7,758,910 B2 * | 7/2010 | Moreau et al. | 427/9 |
| 2002/0028342 A1 | 3/2002 | Haug et al. | |

FOREIGN PATENT DOCUMENTS

| | | | |
|---|---|---|---|
| JP | 56-86606 | * | 5/1980 |
| JP | 56-091912 | | 7/1981 |
| JP | 59-13924 | | 4/1984 |
| JP | 64-7147 | | 2/1989 |
| JP | 4-8498 | | 2/1992 |
| JP | 04-074848 | | 3/1992 |
| JP | 04-270003 | | 9/1992 |
| JP | 7-227604 | * | 8/1995 |
| JP | 10-180315 | | 7/1998 |
| JP | 10-249412 | | 9/1998 |
| JP | 2000-096205 | | 4/2000 |
| JP | 2005-220409 | | 8/2005 |

OTHER PUBLICATIONS

Written Opinion in corresponding PCT/JP2008/068950 dated Jan. 13, 2009.

International Preliminary Report on Patentability in corresponding PCT/JP2008/068950 dated Jun. 1, 2010.

European Search Report for Application No. 08844210.8, dated Sep. 7, 2011.

* cited by examiner

PIERCING AND ROLLING PLUG, METHOD OF REGENERATING SUCH PIERCING AND ROLLING PLUG, AND EQUIPMENT LINE FOR REGENERATING SUCH PIERCING AND ROLLING PLUG

TECHNICAL FIELD

The present invention relates to a piercing and rolling plug (hereinafter also referred to as a "plug" for short) used repeatedly on a piercing and rolling mill in the manufacture of seamless steel pipes, to a method of regenerating such a plug, and to an equipment line for regenerating such a plug.

BACKGROUND ART

The Mannesmann pipe making process is a widely employed process for producing seamless steel pipes by hot working. In the Mannesmann pipe making process, a round billet heated to a predetermined temperature is fed to a piercing and rolling mill (piercer) and the axial central portion of the round billet is pierced, whereby a hollow blank pipe called "hollow shell" is obtained.

The hollow shell, either as it is or after diameter expansion and wall thinning, if necessary, by passing through an elongator of the same configuration as the above-mentioned piercing and rolling mill, is fed to a following elongating rolling mill such as a plug mill or mandrel mill for elongating and rolling. Thereafter, the resulting pipe is passed through a stretch reducer, a reeler, a sizer, etc. for polishing, shape adjustment and sizing; a final product seamless steel pipe is thus produced.

In piercing and rolling by the piercing and rolling mill, a bullet-shaped plug is used as a piercing tool. This plug is mounted on the front end of a core bar or mandrel and used for piercing the billet heated to a high temperature of about 1200° C., so that it is exposed to high-temperature and high-contact-pressure conditions. Therefore, an oxide scale film is formed on the plug surface to protect the plug base metal. The scale film shields the plug against heat from the billet and at the same time plays a role in preventing seizure by the billet.

The scale film on the plug surface is generally formed by subjecting the plug made of a tool steel for how working to heat treatment at a high temperature of about 900° C. to 1000° C. for several to several tens of hours.

In recent years, the demand for seamless steel pipes has shown a trend toward a marked increase and, in particular, the increase in demand for seamless steel pipes for use in severe environments is significant. Seamless steel pipes made of such a high alloy steel species as stainless steel, Ni-based alloy steel or high-Cr-containing steel with a Cr content of 9% or higher are suited for use in severe environments.

When a scale film coated plug is used for piercing and rolling in the production of high alloy steel seamless pipes, a billet high in deformation resistance is to be pierced and therefore the scale film on the plug is susceptible to wear and/or peeling off. Once the scale film on the plug has been worn out or peeled off, the heat-shielding effect diminishes and the temperature of the plug base metal rises, and the plug may possibly be damaged due to heat-related metal wastage.

When a scale film coated plug is used for piercing and rolling in the process of producing high alloy steel seamless pipes, the scale film is generally worn out in several rolling passes and, thus, the life thereof is very short.

If piercing and rolling is continued using a plug with a damaged scale film, seizure failure will occur due to the direct contact between the plug base metal and the billet surface and, at the same time, flaws will be developed on the inside surface of the hollow shell, impairing the quality of the product.

Therefore, in the production of high alloy steel seamless pipes, plug replacement is to be made frequently and, as a result, the production efficiency of the piercing and rolling mill declines. In particular, in the current situation in which efficient production of seamless steel pipes is aimed at and the continuous operation of the Mannesmann pipe making equipment reaches an advanced state, a reduction in production efficiency of the piercing and rolling mill exerts an influence on the efficiency of the whole process of production of seamless steel pipes.

For regenerating and reuse, the plug once used for piercing and rolling and demounted from the mandrel, it is necessary to re-form the scale film; however, lengthy time and a number of steps are required for the necessary heat treatment to that end. Accordingly, it is necessary to keep an immense number of plugs so that even when plug replacement is made with high frequency, any shortage of plugs may not occur to circumvent the decrease in production efficiency of the piercing and rolling mill.

In view of such situation, various investigations have so far been made to prolong the plug lifetime and thereby reduce, as far as possible, the number of plugs to be kept prepared. For example, Japanese Patent Publication No. 04-8498 (hereinafter referred to as "Document 1") proposes a plug base metal increased in high-temperature strength by reducing the Cr content and adding Mo, W and/or the like as well as a plug with an oxide scale excellent in adhesiveness as being formed on and attached to the surface of the plug.

The plug proposed in Document 1 has a drawback in that when the billet piercing length is increased, the plug base metal becomes insufficient in both high-temperature strength and scale film adhesiveness, and hence a satisfactorily long lifetime cannot be secured.

Japanese Patent Application Publication. No. 04-74848 (hereinafter referred to as "Document 2") and Japanese Patent Application Publication No. 04-270003 (hereinafter referred to as "Document 3") propose plugs for which a plug base metal having a chemical composition suited for improvements in high-temperature deformation resistance and crack resistance is employed and on the surface of which an oxide scale is formed. However, the plugs proposed in these Documents 2 and 3 have a drawback in that the scale film in the plug tip portion, where the contact pressure is the highest and the temperature increases in piercing, is melted and loses the heat-shielding ability and wear resistance, with the result that the plug tip readily undergoes damages and/or deformation due to melting-related metal wastage.

Japanese Patent Publication No. 64-7147 (hereinafter referred to as "Document 4") proposes a plug for which a plug base metal containing Cr and Cu as added thereto is used and on the surface of which a scale film is formed. However, the plug proposed in Document 4 also has a drawback in that the plug tip readily undergoes damages and/or deformation due to melting-related metal wastage on the occasion of piercing.

The plugs proposed in the above-cited Documents 1-4, the plug base metal chemical compositions of which have been adjusted, in any case, when applied to piercing and rolling in high alloy steel seamless pipe manufacture, cannot be expected to show satisfactorily prolonged lifetime through such plug base metal composition designing alone.

Further, the plugs proposed in the above Documents 1-4, when repeatedly used for piercing and rolling, all require a long period of heat treatment for scale film regeneration.

Therefore, investigations have so far been made to increase the plug lifetime by changing a plug surface scale film with other than the oxide scale.

For example, Japanese Patent Application Publication No. 10-180315 (hereinafter referred to as "Document 5") proposes a plug increased in high-temperature bending strength by partially replacing the plug surface with ceramic material such as SiC, $Al_2O_3$, $ZrO_2$ or $Si_3N_4$ in lieu of the oxide scale. Japanese Patent Publication No. 59-13924 (hereinafter referred to as "Document 6") proposes a plug with a film formed on the surface thereof by plasma spraying of an Fe oxide powder.

However, the plug proposed in Document 5 is susceptible to damaging of the ceramic portion due to the impact on the occasion of piercing and is thus required to be handled carefully on the occasion of plug replacement and handling. Furthermore, the ceramic-constituted plug itself is expensive and difficult to regenerate. Further, the plug proposed in Document 6 requires a large-scale apparatus for plasma spraying of powders for the preparation and regeneration of the plug, and hence requires huge costs.

DISCLOSURE OF INVENTION

As mentioned hereinabove, investigations have so far been made to prolong a plug lifetime so that the production efficiency in piercing and rolling may not be reduced. However, the plug base metal composition designing alone cannot be expected to bring about a sufficient extent of prolongation of the plug lifetime when the plug is used in piercing and rolling in high alloy steel seamless pipe production.

Further, in the case of reusing the plug in piercing and rolling, a long period of heat treatment is required for scale film regeneration. Therefore, investigations have so far been made in an attempt to constitute the surface film with a ceramic material in lieu of the oxide scale or form a film by plasma spraying of iron oxide powders. The measures attempted in each case, however, cannot be effective for the prolongation of the plug lifetime.

The present invention, which has been made in view of the problems discussed above, has an object to provide a piercing and rolling plug which is long in plug lifetime and, in recycled use thereof, can be regenerated at low cost and in a short period of time, and a method of regenerating of such piercing and rolling plug as well as an equipment line for piercing and rolling plug regeneration in which such plug can be regenerated in an equipment line (on-line) composed of a series of apparatus for recycling of the plug.

To accomplish the above object, the present inventors made intensive investigations in an attempt to prolong the lifetime of the plug in the use thereof for piercing and rolling in seamless steel pipe production and realize the regeneration thereof at low cost and in a short period of time for smooth recycled use and, as a result, they have completed the present invention.

Essentially, the present invention provides (1) a piercing and rolling plug, (2) a method of regenerating the piercing and rolling plug and (3) an equipment line for regenerating the piercing and rolling plug, each defined below.

(1) A piercing and rolling plug for recycled use in a piercing and rolling mill to be employed in seamless steel pipe production is characterized in that the plug has a film composed of oxides and Fe as formed on a shot-blasted plug base metal surface by electric arc spraying using an iron wire.

In the plug according to (1), the proportion of the regions occupied by the oxides in the above-mentioned film is preferably 55-80%. It is also preferred that the proportion of the regions occupied by the oxides in the film be higher on the surface layer side thereof than on the base metal side thereof; in this case, the proportion of the regions occupied by the oxides in the film is preferably not more than 40% in the adjacent portion to the base metal and 55-80% in the surface layer portion. The plug is preferably bullet-like in shape and the thickness of the film in the tip portion is preferably thicker than that in the cylindrical portion. Further, it is preferred that the surface of the film has a lubricant applied thereto. The iron wire preferably contains W.

(2) A method of regenerating the piercing and rolling plug according to (1) for recycled use thereof is characterized in that the surface of the plug is subjected to shot blasting to remove the film as used for piercing and rolling and a film composed of oxides and Fe is then formed by electric arc spraying using an iron wire.

In the regeneration method according to (2), the removal of the film by shot blasting and the film formation by electric arc spraying are preferably carried out only in the tip portion of the bullet-shaped plug.

(3) An equipment line for regenerating a plug for recycled use on a piercing and rolling mill to be employed in seamless steel pipe production is characterized in that the equipment line comprises: a mandrel delivery and receipt apparatus for delivering a mandrel with the above-mentioned plug being mounted thereon and recovering the mandrel after use in piercing and rolling; a plug exchange apparatus for receiving the mandrel after use in piercing and rolling from the mandrel delivery and receipt apparatus and delivering the mandrel to the mandrel delivery and receipt apparatus after replacement of the plug as being used in the piercing and rolling with the regenerated plug; a shot blasting apparatus for receiving the plug as being used in piercing and rolling from the plug exchange apparatus and subjecting the surface of the plug as being used in piercing and rolling to shot blasting; and an electric arc spraying apparatus for receiving the plug treated in the shot blasting apparatus, regenerating the plug by electric arc spraying using an iron wire for formation of a film composed of oxides and Fe on the surface thereof and delivering the thus-regenerated plug to the plug exchange apparatus, where said apparatuses are disposed in the above order to make the equipment line, and, in such line, the plug as being used for piercing and rolling is successively replaced with the regenerated plug, mounted on the mandrel, and then fed repeatedly to the piercing and rolling mill.

The regeneration equipment line according to (3) preferably further comprises a lubricant spraying apparatus for applying a lubricant on the surface of the regenerated plug in the route from the mandrel delivery and receipt apparatus to the piercing and rolling mill, where delivering the mandrel with the regenerated plug mounted thereon is made.

The piercing and rolling plug according to the present invention has a film formed on the plug surface and composed of oxides and Fe and, therefore, is excellent in heat-shielding and seizure-preventing abilities and at the same time has a prolonged lifetime and, in addition, since the film is formed by electric arc spraying, the plug can be prepared and regenerated at low cost and in a short period of time.

According to the method of regenerating the piercing and rolling plug according to the present invention, the plug as being used in piercing and rolling is subjected to shot blasting and electric arc spraying in turn and a film composed of oxides and Fe is re-formed on the plug surface and, therefore, the plug can be regenerated at low cost and in a short period of time.

Further, the equipment line for regenerating the piercing and rolling plug according to the present invention can be realized as an automated regeneration line for plug regeneration and replacement in a short period of time for recycled use of a series of plugs, thus enabling on-line plug regeneration without causing any adverse effect on the efficiency of the seamless steel pipe production process as a whole.

BEST MODES FOR CARRYING OUT THE INVENTION

The piercing and rolling plug according to the present invention is characterized in that, in film formation on the plug base metal surface, a film composed of oxides, such as $Fe_3O_4$ and FeO, and Fe (metal) is formed on the plug base metal surface by electric arc spraying onto the plug base metal surface using an iron wire whose main component is Fe.

By constructing such structure, it becomes possible to form a film, on the surface of a newly prepared plug or a plug to be regenerated, by electric arc spraying in a very short period of time as compared with the conventional cases of scale film formation by heat treatment. In addition, the electric arc spraying apparatus can have a much simpler configuration as compared with the prior art plasma spraying apparatus. Furthermore, the iron wire which is the electric arc spraying material can be obtained at a lower cost as compared with the conventional plasma spraying material powder.

The film mixedly composed of oxides and Fe as formed on the surface of the piercing and rolling plug according to the present invention is excellent in heat-shielding and seizure-inhibiting abilities. In the following, the characteristic features of the piercing and rolling plug according to the present invention are described.

Figure 1:
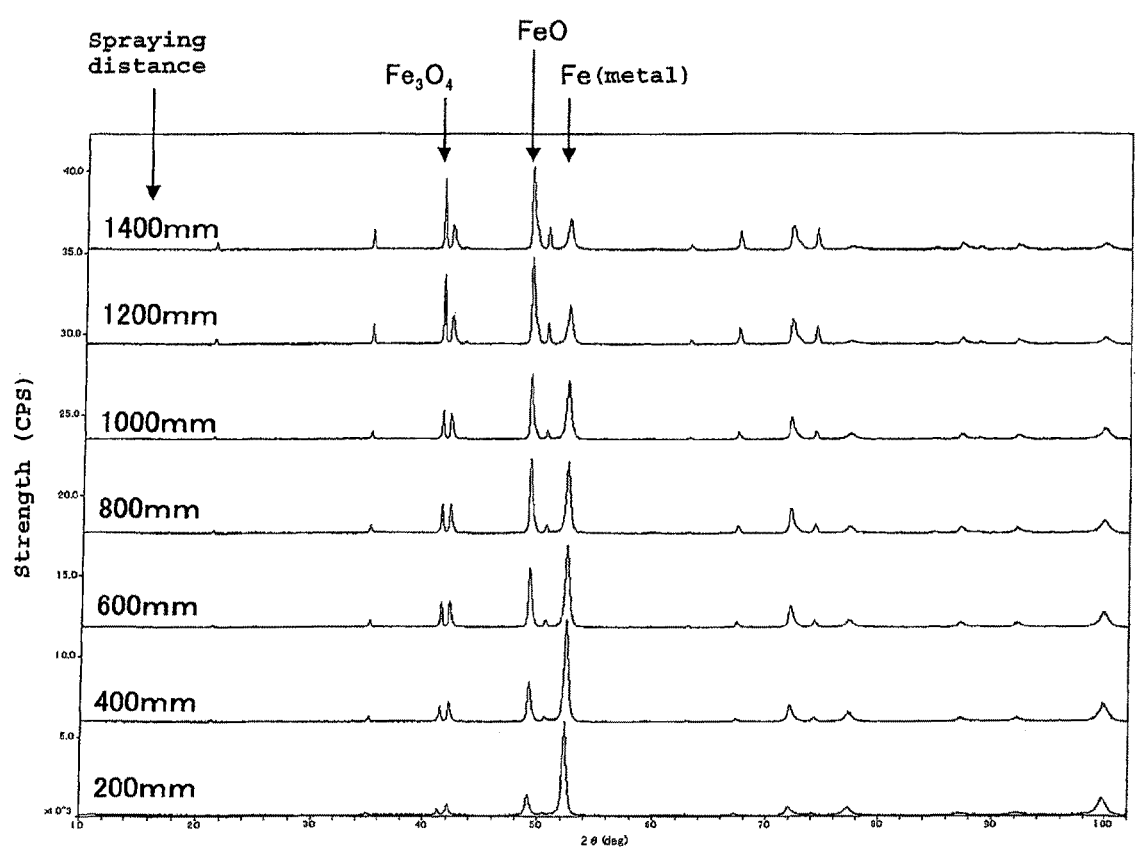
FIG. 1 is a representation of the results of X ray analysis measurements of plug surface films as a function of the electric arc spraying distance.
Figure 2:
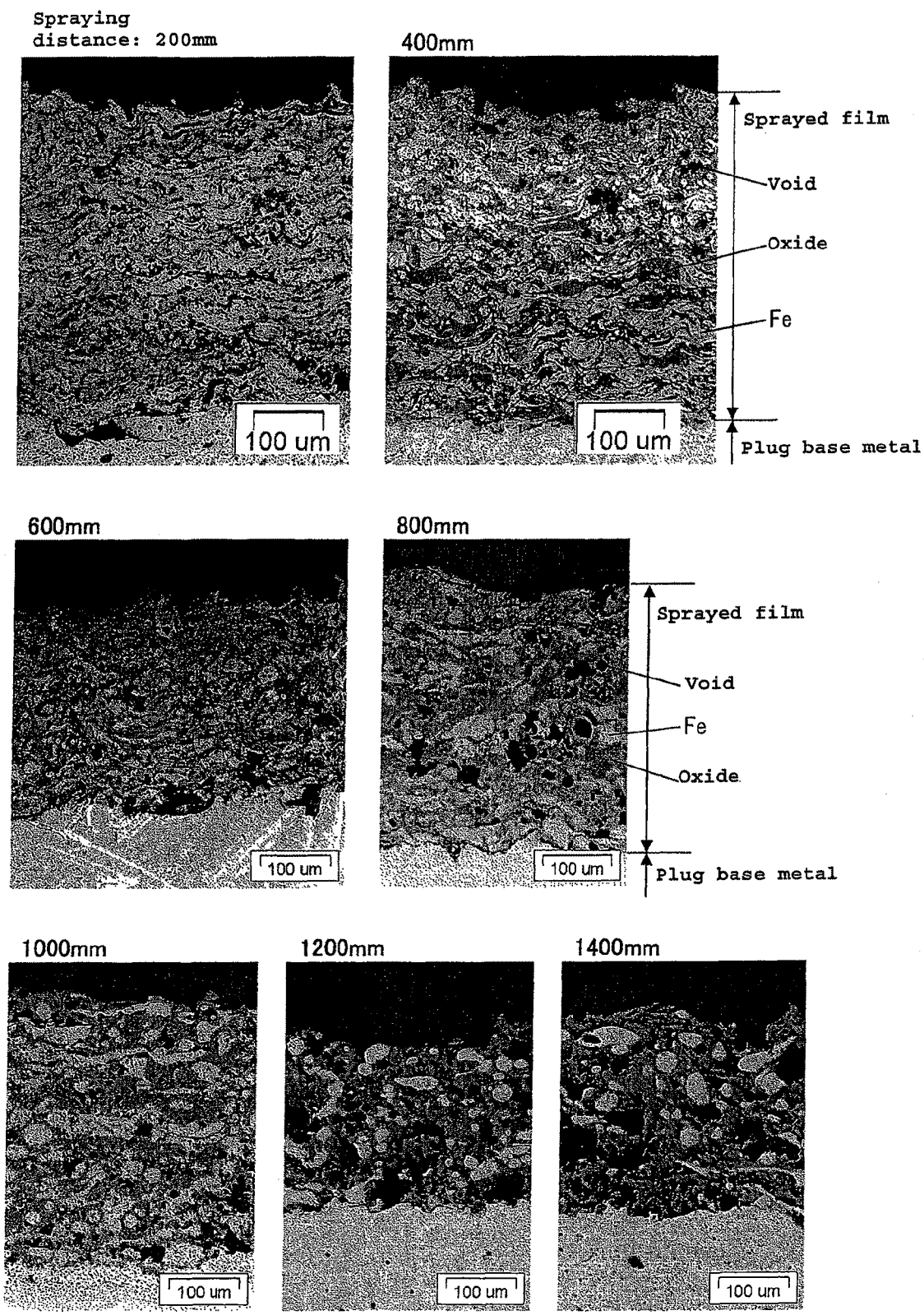
FIG. 2 is representations of the sectional microstructures of plug surface films as a function of the electric arc spraying distance.

FIG. 1 shows the results of X ray analysis measurements of plug surface films as a function of the electric arc spraying distance. FIG. 2 shows the sectional microstructures of plug surface films as a function of the electric arc spraying distance. The spraying distance is the distance from the spraying nozzle of the electric arc spraying apparatus to the surface of the plug base metal, which is the target to be coated. In FIG. 1 and FIG. 2, there are shown the measurement results and sectional microstructures of the films formed by electric arc spraying from the respective spraying distances of 200 mm, 400 mm, 600 mm, 800 mm, 1000 mm, 1200 mm and 1400 mm.

FIG. 1 shows that, in the films formed on the plug base metal surface by electric arc spraying, the content of the oxides, $Fe_3O_4$ and FeO, increases and the Fe content decreases with the increase in spraying distance. This is due to the fact that the oxidation of the molten spraying material (Fe) sprayed from the spraying nozzle proceeds as the spraying distance increases.

In the sectional views of the films as shown in FIG. 2, each region observed with a pale gray color represents Fe, each region observed as a dark gray color represents an oxide, and each region observed as a black color represents a void, as so indicated in the views. As is seen from the same view, when the spraying distance is 200 mm, for example, oxides occupy 20%-30% of the whole region of the film, with the remaining 70%-80% of the whole region being occupied by Fe. When the spraying distance is 1000 mm, oxides occupy about 80% of the region of the film, with the remaining about 20% of the region being occupied by Fe. The microstructures in FIG. 2 also indicate that as the spraying distance is increased, the proportion of oxides increases while the amount of Fe decreases.

In such a manner, the proportion of regions occupied by oxides in the film (hereinafter referred to as "oxide ratio") varies depending on the spraying distance. Therefore, by adjusting the spraying distance, it is possible to control the oxide ratio in the film.

Figure 3:
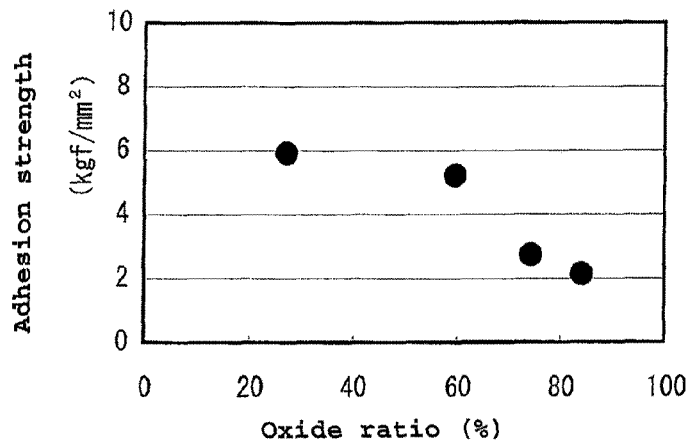
FIG. 3 is a representation of the correlation between the proportion of oxides in the plug film and the adhesion strength of the film.

FIG. 3 shows the correlation between the oxide ratio in the plug film and the adhesion strength of the film. The adhesion strength of the film is indicative of performance in tightness and close adhesion with the plug base metal surface and serves as an indicator of the peel-off resistance in piercing and rolling. Thus, when the adhesive strength is high, the film is hardly peeled off and, when the adhesion strength is low, the film is easily peeled off. As shown in FIG. 3, the peel-off resistance of the film decreases as the oxide ratio in the film increases and, at oxide ratios exceeding 80%, it decreases rapidly.

Figure 4:
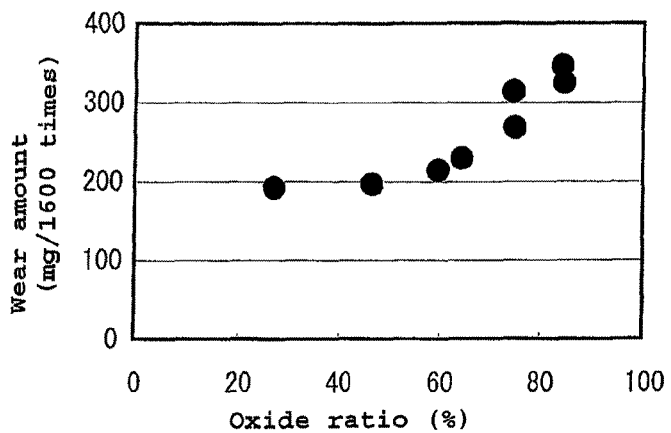
FIG. 4 is a representation of the correlation between the proportion of oxides in the plug film and the film wear amount.

FIG. 4 shows the correlation between the oxide ratio in the plug film and the film wear amount. The film wear amount represents the decrease in weight after 1600 repetitions of scrubbing of the surface film and serves as an indicator of the wear resistance in piercing and rolling. Thus, when the wear amount is small, the film is hardly worn out and, when the wear amount is great, the film is easily worn out. As shown in FIG. 4, the wear resistance of the film decreases as the oxide ratio in the film increases and, at oxide ratios exceeding 80%, it decreases rapidly.

The decreases in the peel-off resistance and wear resistance of the film with the increase in the oxide ratio in the film, as shown in FIG. 3 and FIG. 4, are attributed to the decrease of Fe (metal) that is interposed between adjacent discrete oxides to thereby serve for bonding them together.

While the peel-off resistance and wear resistance of the film are secured at higher level as the oxide ratio in the film decreases, as seen from FIG. 3 and FIG. 4, an excessively low oxide ratio level means that Fe occupies the major part of the film, with the result that the thermal conductivity becomes relatively high but the heat-shielding ability declines. Therefore, the plug tip portion becomes readily susceptible to damaging and deformation due to melting-related wastage on the occasion of piercing and rolling.

Figure 5:
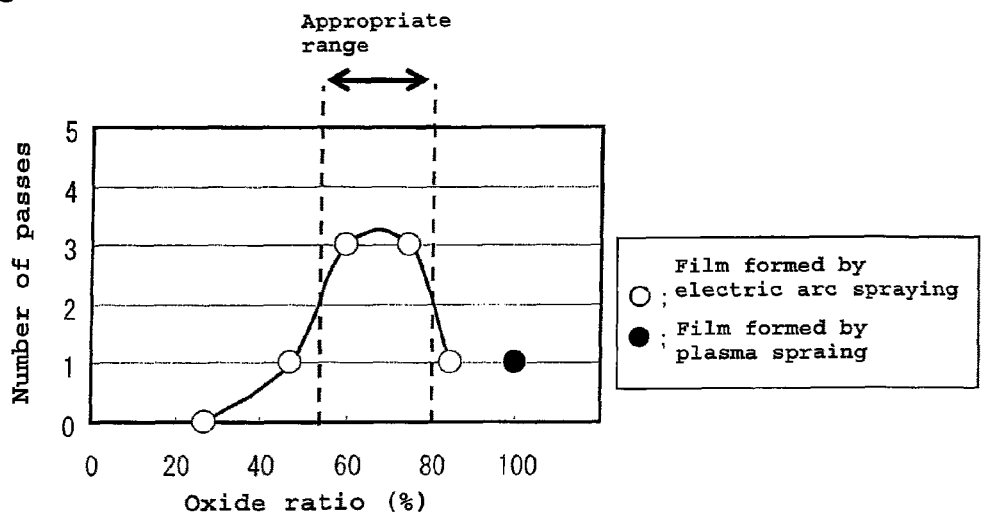
FIG. 5 is a representation of the correlation between the proportion of oxides in the plug film and the number of successive piercing and rolling runs (number of passes).

FIG. 5 shows the correlation between the oxide ratio in the plug film and the number of successive piercing and rolling runs (number of passes). In carrying out demonstration testing, from which the results shown in that view had been derived, test sample plugs were prepared using a hot working tool steel as prescribed in JIS and an about 400-μm-thick film was formed on the surface of each plug base metal by electric arc spraying using an iron wire.

On the occasion of electric arc spraying, the position of the spraying nozzle was adjusted to the corresponding spraying distance so that the oxide ratio in the film can be 25, 45, 60, 75 or 85%. Further, for comparison, a film was formed on the plug base metal surface by plasma spraying of a $Fe_3O_4$ powder. This plasma-sprayed plug corresponds to the plug proposed in the above-cited Document 6 and the film is composed of 100% oxides.

Using the test sample plugs obtained, tests were carried out in which workpieces were successively pierced and rolled. Used as the workpieces were round billets each having an outside diameter of 70 mm and a length of 1000 mm and made of SUS304 (austenitic stainless steel defined in JIS) as being a high alloy steel. These workpieces were heated to 1200° C. and then subjected to piercing testing, using the above-mentioned test sample plugs, to produce hollow shells each with an outside diameter of 74 mm, a wall thickness of 8.6 mm and a length of 2200 mm.

In this test, for each test sample plug, the appearance thereof was examined after each piercing and rolling pass, and the plug lifetime was evaluated and determined in terms of the number of passes at the time that damaging or deformation due to melting-related metal wastage was found in the plug tip portion, namely the maximum number of passes in which piercing and rolling could be successfully successively repeated (number of successive piercing and rolling passes).

As outlined circles in FIG. 5 indicate, the number of successive piercing passes was 0 (zero) in the case of the plug with the oxide ratio in the film being 25%, the number of successive piercing passes was 1 in the case of the plug with the oxide ratio being 45% or 85%, and the number of successive piercing passes was 3 in the case of the plug with the oxide ratio being 60% or 75%.

In the case of the plasma-sprayed plug for comparison, the number of successive piercing passes was 1, as indicated by a solid circle in FIG. 5. Further, in the case of the plug with the oxide ratio in the film being 25% or 45%, the occurrence of damaging or deformation due to melting-related metal wastage was observed at the plug tip portion.

From the results shown in FIG. 5, it is evident that those plugs which have a film formed by electric arc spraying with the oxide ratio therein as adjusted to 55-80% have a plug lifetime at least twice that of the plasma-sprayed plug and, further, that those plugs which have a film with the oxide ratio therein as adjusted to 60-75% have a plug lifetime at least three times that of the plasma-sprayed plug.

Therefore, when the oxide ratio in the film is adjusted to 55-80%, the plug according to the present invention for use in piercing and rolling in the production of high alloy steel seamless pipes, shows a longer lifetime as compared with the prior art plasma-sprayed plug. Further, from the viewpoint of further prolongation of the plug lifetime, it is preferred that the oxide ratio in the film be adjusted to 60-75%.

Next, in relation to the effects of the oxide ratio in the film as revealed by the results shown in FIG. 5, a further effectiveness aspect is now discussed. In the case of the plugs used in the test, from which the results shown in FIG. 5 were derived, the films were formed by carrying out electric arc spraying in a condition such that the spraying distance was kept constant so as to obtain a film having a uniform oxide ratio over the whole region from an adjacent portion to the base metal to the surface layer portion. In this regard, a further study was made this time using plugs with a film formed by electric arc spraying while the spraying distance was gradually increased so that the oxide ratio in the film might gradually increase toward the surface layer side.

Thus, in the film formation, the electric arc spraying was started in a state such that the spraying nozzle was closest to the plug base metal surface, namely in a state such that the spraying distance was short, the spraying nozzle was then gradually distanced from that surface, and the electric arc spraying was completed in a state such that the spraying distance became long. In this way, there was formed on the plug base metal surface a film with the oxide ratio gradually increasing toward the surface layer side. In this film, the oxide ratio was low in the adjacent portion to the base metal and the oxide ratio was high in the surface layer portion.

Figure 6:
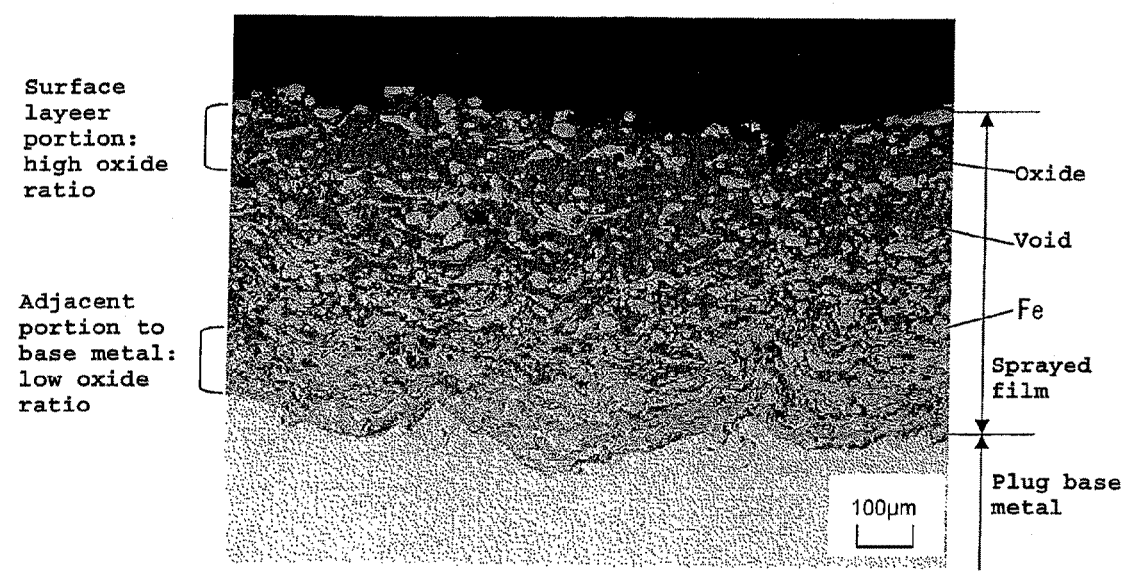
FIG. 6 is a representation of the sectional microstructure of a plug surface film obtained by electric arc spraying while gradually increasing the spraying distance.

FIG. 6 shows the sectional microstructure of the plug surface film obtained by electric arc spraying while gradually increasing the spraying distance. In the cross-section of the film as shown in that view, likewise in FIG. 2 referred to hereinabove, each region observed as a pale gray color represents Fe, each region observed as a dark gray color represents an oxide, and each region observed as a black color represents a void. As shown in FIG. 6, the film formed on the plug base metal surface is low in oxide ratio in the adjacent portion to the base metal and the surface layer portion shows an increased oxide ratio.

Using test sample plugs having such a film, tests as the piercing test mentioned above were carried out likewise. The evaluation was made based on the plug lifetime expressed in terms of the above-mentioned number of successive piercing and rolling runs (number of passes). For comparison, a plug with a film uniform in oxide ratio in the whole region as formed on the plug base metal surface by electric arc spraying while keeping a constant spraying distance was also tested in the same manner. The results of the test are shown below in Table 1.

TABLE 1

| Test No. | Electric arc spraying conditions Spraying distance | Number of successive piercing passes |
|---|---|---|
| 1 | Constant at 1000 mm | 2 passes |
| 2 | Varied from 200 mm to 1000 mm | 4 passes |
| 3 | Varied from 400 mm to 1000 mm | 3 passes |
| 4 | Varied from 500 mm to 1000 mm | 2 passes |

As shown in the table, the plug of Test No. 1 was provided with a film by electric arc spraying from a constant spraying distance at 1000 mm, and the oxide ratio in the film was uniformly about 80% throughout the whole range of the film.

On the other hand, the plug of Test No. 2 was provided with a film by electric arc spraying while gradually varying the spraying distance from 200 mm to 1000 mm, the plug of Test No. 3 was provided with a film by electric arc spraying while gradually varying the spraying distance from 400 mm to 1000 mm, and the plug of Test No. 4 was provided with a film by electric arc spraying while gradually varying the spraying distance from 500 mm to 1000 mm. As a result, in the film of the plug of Test No. 2, the oxide ratio was about 25% in the adjacent portion to the base metal and about 80% in the surface layer portion; in the film of the plug of Test No. 3, the oxide ratio was about 40% in the adjacent portion to the base metal and about 80% in the surface layer portion; and in the film of the plug of Test No. 4, the oxide ratio was about 50% in the adjacent portion to the base metal and about 80% in the surface layer portion.

The plugs of Test Nos. 1-4 all had a film thickness of about 400 μm.

As shown in Table 1, for the plug of Test No. 1 with a uniform oxide ratio in the film, the number of successive piercing passes was 2. On the other hand, among the plugs of Test Nos. 2-4 in which the oxide ratio in the film was higher on the surface layer side than on the base metal side, the number of successive piercing passes was 4 in the case of the plug of Test No. 2, and the number of successive piercing passes was 3 in the case of the plug of Test No. 3 and, in each case, the number of successive piercing passes was bigger as compared with the plug of Test No. 1. In the case of the plug of Test No. 4, the number of successive piercing passes was 2 and thus was equivalent to the number of successive piercing passes for the plug of Test No. 1.

From the results shown in Table 1, it is evident that: the plugs having a film in which the oxide ratio is higher on the surface layer side than on the base metal side are comparable in plug lifetime to or longer than the plugs having a film uniform in oxide ratio throughout the whole region thereof; and further, the plugs with a film as having the oxide ratio of 40% or less in the adjacent portion to the base metal have a prolonged plug lifetime. This is due to the fact that the adjacent portion of the film to the base metal is low in oxide ratio and therefore rich in Fe (metal), so that the adhesion of the film to the plug base metal is fortified and, as a result, the stress imposed is relaxed and the film is hardly peeled off.

Accordingly, it is preferred that the oxide ratio in the film of the plug of the present invention be higher on the surface layer side than on the base metal side and, in particular, it is more preferable that the oxide ratio in the adjacent portion to the base metal be not less than 40% and the oxide ratio in the surface layer portion be 55-80%.

Now, the thickness aspect of the film formed on the plug base metal surface is discussed. While the plugs each tested above had a bullet-like external shape with a uniformly thick film being formed in the whole range from the cylindrical portion of the plug to the tip portion, the film thickness in the cylindrical portion and that in the tip portion were varied now so as to identify the influences of the film thickness in the cylindrical portion and that in the tip portion. The thus-prepared test sample plugs with such a film were tested in the same manner as in the piercing test mentioned above. The evaluation was made based on the plug lifetime expressed in terms of the above-mentioned number of successive piercing and rolling runs (number of passes), likewise in the evaluation results as shown in Table 1. The test results obtained are shown below in Table 2.

TABLE 2

| | Film thickness | | Number of |
|---|---|---|---|
| Test No. | Cylindrical portion | Tip portion | successive piercing passes |
| 11 | 400 μm | 400 μm | 4 passes |
| 12 | 400 μm | 600 μm | 5 passes |
| 13 | 400 μm | 800 μm | 6 passes |
| 14 | 600 μm | 800 μm | 6 passes |
| 15 | 800 μm | 800 μm | 1 pass |
| 16 | 400 μm | 1200 μm | 10 passes |

As shown in the above table, the plug of Test No. 11 was provided with a film having a uniform thickness of about 400 μm from the cylindrical portion to the tip portion. The plug of Test No. 12 was provided with a film having a thickness of about 400 μm in the cylindrical portion and a thickness of about 600 μm in the tip portion, the plug of Test No. 13 was provided with a film having a thickness of about 400 μm in the cylindrical portion and a thickness of about 800 μm in the tip portion, and the plug of Test No. 14 was provided with a film having a thickness of about 600 μm in the cylindrical portion and a thickness of about 800 μm in the tip portion. The plug of Test No. 15 was provided with a film having a uniform thickness of about 800 μm in the whole range from the cylindrical portion to the tip portion. The plug of Test No. 16 was provided with a film having a thickness of about 400 μm, like the plugs of Test Nos. 11-13, in the cylindrical portion and a thickness greater than in any of the other plugs, namely about 1200 μm, in the tip portion.

In any of plugs of Test Nos. 11-16, the film was formed by electric arc spraying while varying the spraying distance from 200 mm to 1000 mm and, therefore, the oxide ratio in the film was higher on the surface layer side than on the base metal side.

As shown in Table 2, the number of successive piercing passes was 4 with the plug of Test No. 11 small and uniform in film thickness in the whole range. With the plugs of Test Nos. 12, 13, 14 and 16 in which the film was heavier in the tip portion than in the cylindrical portion, the numbers of successive piercing passes were 5, 6, 6 and 10, respectively, and the number of successive piercing passes increased with the increase in film thickness in the plug tip portion. With the plug of Test No. 15 great and uniform in film thickness in the whole range, the film in cylindrical portion of the plug was peeled off after a single piercing pass and, thus, the number of successive piercing passes was only 1.

From the results shown in Table 2, it is evident that the heavier the film thickness in the plug tip portion is, the more prolonged the plug lifetime is. Further, when the film thickness in the cylindrical portion of the plug is excessively heavy, peeling off of the film occurs on the occasion of piercing and the plug lifetime is shortened thereby. Therefore, it is preferred that the film thickness be heavier in the tip portion than in the cylindrical portion and that the film thickness in the cylindrical portion of the plug be lighter than 800 μm, more preferably within the range of 400 μm to 600 μm.

Meanwhile, on the occasion of piercing and rolling of a billet on the piercing and rolling mill, the billet heated to a high temperature is fed in an axial direction thereof at a constant rate while the billet is rotated by means of a plurality of revolving rolls (piercer rolls) disposed around the billet. In front of the driven billet, there is disposed the plug along an axial line of the billet and the front face of the billet is pressed against the plug tip, whereupon the piercing and rolling is started. When the billet is fed until the plug completely goes through the billet, the piercing and rolling end.

On that occasion, the velocity at which the billet is fed in an axial direction thereof (hereinafter referred to as "feeding velocity") is determined by the number of revolutions of the piercer rolls. However, the actual feeding velocity during piercing becomes slower as compared with the theoretical feeding velocity calculated from the set number of revolutions of the piercer rolls due to the influences by the frictional resistance between the plug and the billet in contact with each other and the like. The velocity ratio (=(actual feeding velocity)/(theoretical feeding velocity)×100 [%]) is generally referred to as "piercing efficiency".

When the piercing efficiency is high, not only the production efficiency of the piercing and rolling mill is improved but also the time of contact between the plug and the billet is shortened, hence prolongation of the plug lifetime can be expected. Therefore, in piercing and rolling, it is very important to improve the piercing efficiency.

Therefore, a discussion is now held about the improvement of the piercing efficiency by means of the plugs mentioned above. First, test sample plugs were prepared by forming a film on the plug surface by electric arc spraying and then forming thereon a layer of a lubricant commonly used in high temperature environments, and they were tested in the same manner as in the piercing test mentioned above. For comparison, plugs having no lubricant layer were also subjected to the same test. The evaluation was performed based on the average piercing efficiency calculated from the piercing efficiency data in the respective passes until the end of the lifetime of the plug. The test results thus obtained are shown below in Table 3.

TABLE 3

| Test No. | Electric arc spraying conditions Spraying distance | Lubricant | Average piercing efficiency |
|---|---|---|---|
| 21 | Constant at 600 mm | None | 59.0% |
| 22 | Constant at 1000 mm | None | 59.9% |
| 23 | Varied from 200 mm to 1000 mm | None | 73.8% |
| 24 | Constant at 600 mm | Boric acid | 80.3% |
| 25 | Constant at 1000 mm | Water glass | 82.1% |
| 26 | Varied from 200 mm to 1000 mm | Boron nitride | 85.8% |

As shown in the above Table, the plugs of Test Nos. 21-23 had no lubricant layer on the film surface, hence the films were exposed. On the other hand, the plugs of Test Nos. 24-26 had, on the film surface, a layer of a lubricant as applied. The lubricant used was boric acid ($H_3BO_3$) for the plug of Test No. 24, water glass (concentrated aqueous solution of sodium silicate ($Na_2SiO_3$)) for the plug of Test No. 25, or boron nitride (BN) for the plug of Test No. 26.

The films on the plugs of Test Nos. 21, 22, 24 and 25 were formed by carrying out electric arc spraying while keeping a constant spraying distance and, therefore, the oxide ratio in the film was uniform all over the whole range. The films on the plugs of Test Nos. 23 and 26 were formed by carrying out electric arc spraying while gradually varying the spraying distance from 200 mm to 1000 mm, and the oxide ratio in the film was higher on the surface layer side than on the base metal side.

As shown in Table 3, the plugs of Test Nos. 21, 22 and 23, which had no lubricant layer on the film surface, exhibited average piercing efficiencies of 59.0%, 59.9% and 73.8%, respectively. On the contrary, the plugs of Test Nos. 24, 25 and 26, which had a lubricant layer on the film surface, showed average piercing efficiencies of 80.3%, 82.1% and 85.8%, respectively; the average piercing efficiencies were thus higher by about 10% to 20% as compared with the plugs of Test Nos. 21-23 which had no lubricant layer.

From the results shown in Table 3, it is evident that the application of a lubricant onto the film surface results in improvements in piercing efficiency. Therefore, it is preferred that the plug of the present invention have a lubricant layer on the film surface. In addition to boric acid, water glass and boron nitride, graphite and the like can also be used as a lubricant.

Further, the effectiveness of the iron wire to be used in electric arc spraying for forming a film on the plug base metal surface is discussed. Thus, films were formed on the plug base metal surface using various iron wires for electric arc spraying, and the thus-prepared test sample plugs were subjected to the same test as the piercing test mentioned above. The evaluation was made based on the above-mentioned average piercing efficiency, likewise in the evaluation results shown in Table 3 as above. The results thus obtained are shown below in Table 4.

TABLE 4

| Test No. | Electric arc spraying conditions Wire | Average piercing efficiency |
|---|---|---|
| 31 | Fe | 73.8% |
| 32 | Fe—W | 81.4% |
| 33 | Fe—Mn—W | 79.6% |

As shown in the above Table, the film on the plug of Test No. 31 was formed by electric arc spraying using an Fe type iron wire free of metal elements other than Fe (if any, at unavoidable content levels). It is to be noted that this Fe-based iron wire was also used in electric arc spraying onto all the plugs mentioned hereinabove.

The film on the plug of Test No. 32 was formed by electric arc spraying using an Fe—W type iron wire containing 4% by mass of W. The film on the plug of Test No. 33 was formed by electric arc spraying using an Fe—Mn—W type iron wire further containing 3% by mass of Mn.

The films on the plugs of Test Nos. 31-33 were all formed by carrying out electric arc spraying while varying the spraying distance from 200 mm to 1000 mm and, therefore, the oxide ratio in the film was higher on the surface layer side than on the base metal side.

As shown in Table 4, the average piercing efficiency was 73.8% in the case of the plug of Test No. 31 which had a film formed by electric arc spraying using the Fe type iron wire. On the contrary, the plugs of Test Nos. 32 and 33 which had a film formed by electric arc spraying using a W-containing iron wire showed average piercing efficiencies of 81.4% and 79.6%, respectively, which were higher by about 10% as compared with the plug of Test No. 31 prepared by using the Fe type iron wire.

From the results shown in Table 4, it is evident that the use of a W-containing iron wire in film formation by electric arc spraying results in improving a piercing efficiency. This is due to the fact that $WO_3$, which is a low-melting-point oxide, is further formed as an oxide in the film and this $WO_3$ melts on the occasion of piercing and thereby produces a liquid lubrication effect. Therefore, it is preferred that the film on the plug of the present invention be formed by electric arc spraying using a W-containing iron wire.

Then, a discussion is held about an appropriate range of W content in the W-containing iron wire for use in electric arc spraying. Here, electric arc-sprayed films were formed on the plug base metal surface using iron wires varied in W content (% by mass), and the thus-prepared test sample plugs were tested in the same manner as in the above-mentioned piercing test.

Figure 7:
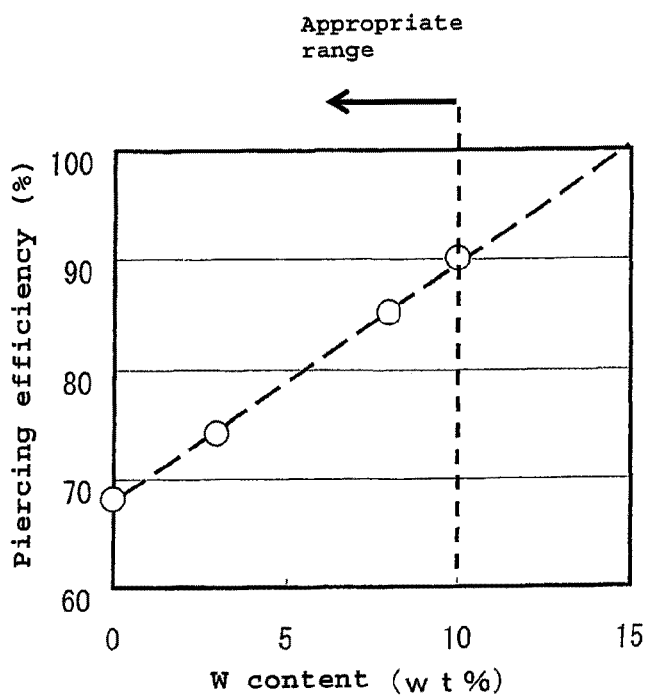
FIG. 7 is a representation of the relation between a W content and a piercing efficiency for plugs with a film formed thereon by electric arc spraying using a W-containing iron wire.

FIG. 7 shows the relation between the W content and the piercing efficiency for plugs with a film formed thereon by electric arc spraying using a W-containing iron wire. As shown in that view, it is seen that as the W content in the iron wire for electric arc spraying increases, the piercing efficiency increases. This is due to the fact that when electric arc spraying is carried out using an iron wire having a high W content, the amount of $WO_3$ formed in the film increases and the liquid lubrication effect on the occasion of piercing is enhanced accordingly. Therefore, for improving the piercing efficiency, it is effective to increase the W content in the iron wire for electric arc spraying.

Figure 8:
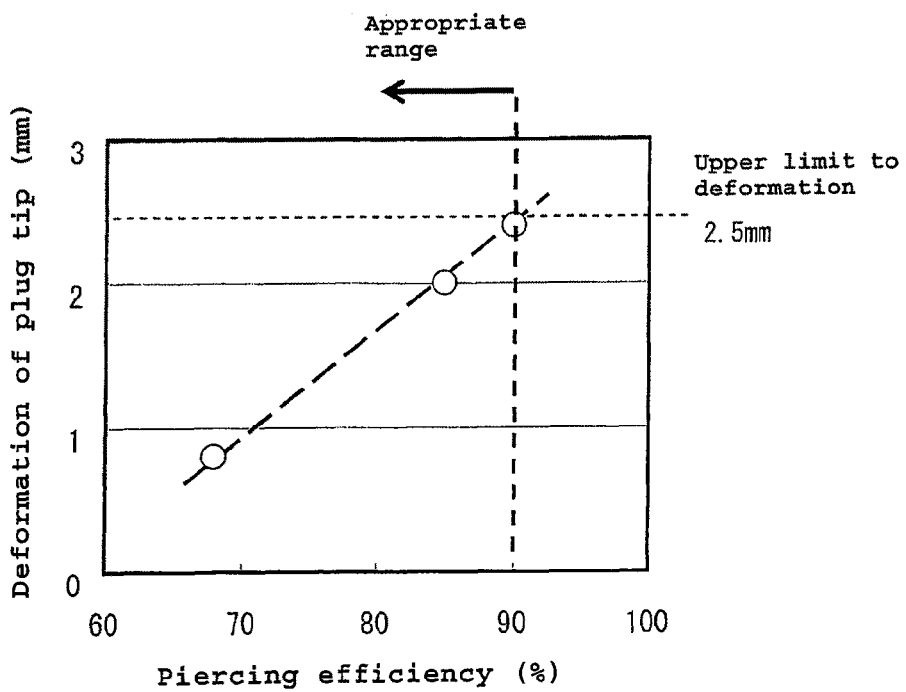
FIG. 8 is a representation of the relation between a piercing efficiency and an extent of plug tip deformation for plugs with a film formed thereon by electric arc spaying using a W-containing iron wire.

FIG. 8 shows the relation between the piercing efficiency and the extent of plug tip deformation for plugs with a film formed thereon by electric arc spaying using a W-containing iron wire. As shown in that figure, it is seen that there is a tendency for the plug tip deformation to increase as the piercing efficiency increases. This is due to the fact that while a coated plug showing a high piercing efficiency can be obtained by electric arc spraying using an iron wire with a high W content, as indicated by the results shown in FIG. 7 referred to above, a plug showing a high piercing efficiency, on the contrary, suffers a loss in weight of the film itself due to melting of $WO_3$ during piercing, with the result that the heat-shielding ability of the film declines.

When the extent of the plug tip deformation exceeds 2.5 mm, the frequency of occurrence of seizure failure during piercing generally increases. Therefore, in view of the results shown in FIG. 8, it is preferred that the piercing efficiency of the plug be not more than 90% so that the extent of the plug tip deformation may become not more than 2.5 mm; for realizing this, the upper limit to the W content in the iron wire for use in electric arc spraying is preferably set at 10% by mass. From the practicality viewpoint, the W content is more preferably within the range of 2-5% by mass.

Although, as described hereinabove, the effectiveness of the film formed on the plug base metal surface by electric arc spraying is now evident, it is desirable to take the economic feature thereof into consideration in practicing the regeneration of such plug having an electric arc-sprayed film in real operation. Therefore, test sample plugs were prepared by forming an electric arc-sprayed film about 800 μm in thickness in the plug tip portion and about 400 μm in thickness in the cylindrical portion and were subjected to piercing testing under the same conditions as in the above-mentioned piercing test; the number of successive piercing passes was 1 pass to 10 passes. How the film on each plug wears after each pass was examined. For comparison, plugs were prepared by heat-treating and forming a scale film, 300 μm or 500 μm in thickness, on the plug surface in the whole range from the tip portion of the cylindrical portion and subjected to the same investigation.

Figure 9:
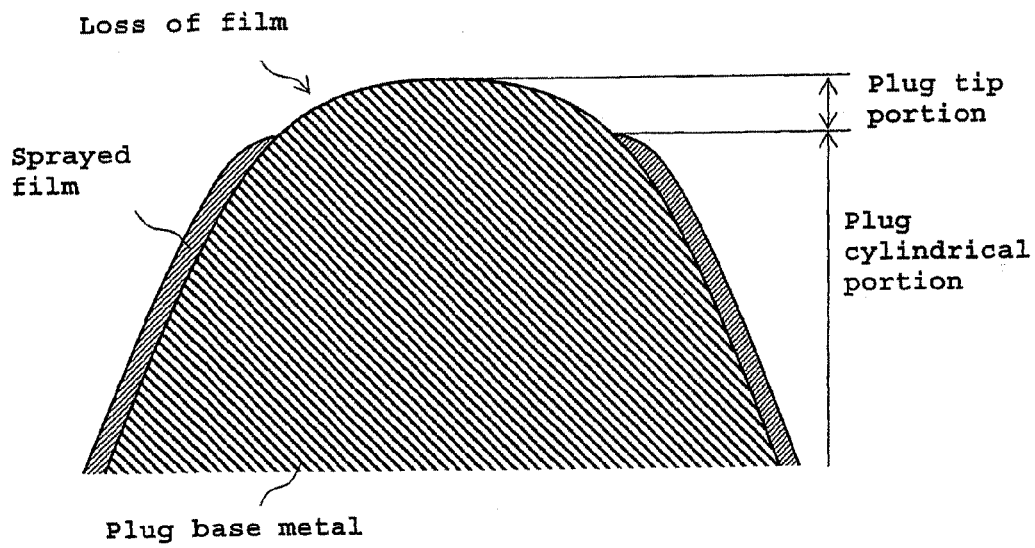
FIG. 9 is a schematic sectional representation of the tip portion and the vicinity thereof of a plug with a film formed by electric arc spraying, as being observed after 10 passes of piercing.
Figure 10:
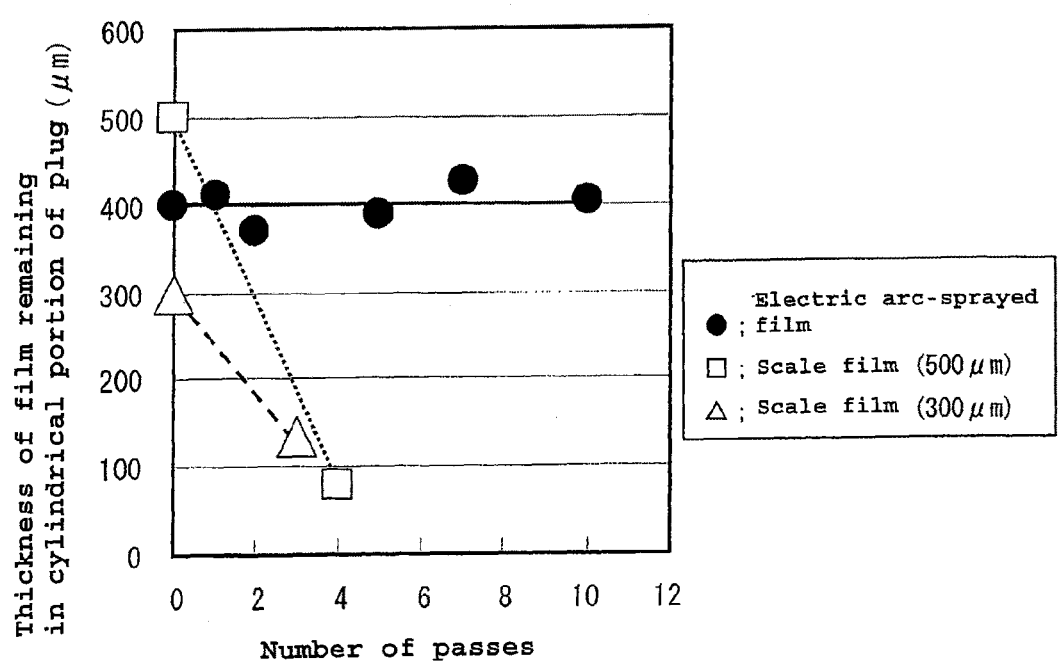
FIG. 10 is a representation of the correlation between the number of successive piercing passes and the thickness of the film remaining on the cylindrical portion of the plug.

FIG. 9 is a schematic sectional representation of the tip portion and the vicinity thereof of the plug with a film formed by electric arc spraying as observed after 10 piercing passes. FIG. 10 is a representation of the correlation between the number of successive piercing passes and the thickness of the film remaining on the cylindrical portion of the plug.

As shown in FIG. 9, in the case of the plug coated by electric arc spraying, the film in the plug tip portion was found lost by wear and peeling off after 10 piercing passes while no significant wear or peeling off of the film was observed in the cylindrical portion. Further, as shown in FIG. 10, it was revealed that the film thickness in the cylindrical portion of the plug coated by electric arc spraying remains unchanged even after 10 piercing passes. On the other hand, in the case of the scale-coated plugs, the film thickness rapidly decreases not only in the tip portion but also in the cylindrical portion and, as shown in FIG. 10, the film thickness in the cylindrical portion of the plug decreased to about 100 μm and the lifetime of the plug ended after 3 or 4 piercing passes.

In view of the foregoing, it is not always necessary to subject the cylindrical portion of the plug coated by electric arc spraying to regeneration treatment since the film in the cylindrical portion is hardly damaged during piercing; there is the possibility that the plug can be reused after subjecting only the tip portion thereof, where the film is damaged, to regeneration treatment.

Then, for checking whether the plug after regeneration treatment of the tip portion thereof alone can be reused or not, the following test was carried out. First, preliminarily, under the same conditions as in the above-mentioned test, three test sample plugs coated by electric arc spraying to a film thickness of about 800 μm in the plug tip portion and a film thickness of about 400 μm in the cylindrical portion of the plug were prepared and subjected to test piercing; the number of successive piercing passes was 5. These plugs after preliminary piercing runs were respectively subjected to regeneration treatment under the conditions A, B and C given below in Table 5 and, thereafter, the regenerated plugs were subjected to the piercing test under the same conditions as in the test mentioned above; the evaluation was made in terms of the lifetime of the plug as expressed in terms of the number of successive piercing passes.

For comparison, a plug with a 600-μm-thick scale film formed in the whole range of the plug surface by heat treatment, as shown below in Table 5 under D, was subjected to the same test and evaluation. The results of testing of those plugs are shown in Table 5.

TABLE 5

| Test No. | Regeneration treatment conditions | Film condition | Number of successive piercing passes |
|---|---|---|---|
| A | Shot blasting all over the surface → Electric arc spraying all over the surface | Tip portion: 800 μm in thickness Cylindrical portion: 400 μm in thickness | 6 passes |
| B | Shot blasting omitted → Electric arc spraying only in the tip portion | Tip portion: 800 μm in thickness Cylindrical portion: as used in piercing | 2 passes |
| C | Shot blasting only in the tip portion → Electric arc spraying only in the tip portion | Tip portion: 800 μm in thickness Cylindrical portion: as used in piercing | 6 passes |

TABLE 5-continued

| Test No. | Regeneration treatment conditions | Film condition | Number of successive piercing passes |
|---|---|---|---|
| D | Heat treatment (scale film formation) | Tip portion: 600 μm in thickness Cylindrical portion: 600 μm in thickness | 3 passes |

As shown in the above Table, the plug after regeneration treatment A was the one that was prepared by: removing the whole film as used in the preliminary piercing and rolling runs by shot blasting; and re-forming a film on the whole range of the surface by electric arc spraying. The plug after regeneration treatment B was the one that was prepared by: re-forming a film in the plug tip portion alone by electric arc spraying after the preliminary piercing runs without conducting shot blasting. The plug after this regeneration treatment B kept the film in the cylindrical portion thereof as used in the preliminary piercing and rolling runs.

The plug after regeneration treatment C was the one that was prepared by: removing the film in the tip portion alone by shot blasting of the plug tip portion alone after the preliminary piercing; and re-forming a film by electric arc spraying in that tip portion alone. In this plug after regeneration treatment C, the film in the cylindrical portion remained in the condition as used in the preliminary piercing and rolling runs.

As shown in Table 5, in the case of the plug after regeneration treatment A, namely after shot blasting all over the surface followed by electric arc spraying, the number of successive piercing passes was 6. With the plug after regeneration treatment C, namely after shot blasting of the plug tip portion alone followed by electric arc spraying in the tip portion alone, the number of successive piercing passes was also 6 and thus the lifetime that could be achieved was equal to that of the plug after regeneration treatment A.

On the other hand, with the plug after regeneration treatment B, namely after electric arc spraying in the plug tip portion alone without shot blasting, the adhesion strength of the film in the plug tip portion was low because of the omission of shot blasting in the regeneration treatment and the number of successive piercing passes was no more than 2. With the scale-coated plug D, the number of successive piercing passes was only 3.

From the above results, it is evident that the plugs coated by electric arc spraying, when regenerated by re-forming the film by electric spraying following shot blasting only in the plug tip portion, can have a long lifetime. Further, in such partial regeneration treatment, the consumption of the blasting material for shot blasting and of the iron wire for electric arc spraying can be reduced, hence such treatment is economical and advantageous. It is therefore desirable that, in regenerating plugs coated by electric arc spraying in actual industrial operation, the plug tip portion alone be subjected to shot blasting and electric arc spraying.

Now, a regeneration method and a regeneration equipment line suited for regenerating the piercing and rolling plug according to the present invention are described.

Figure 11:
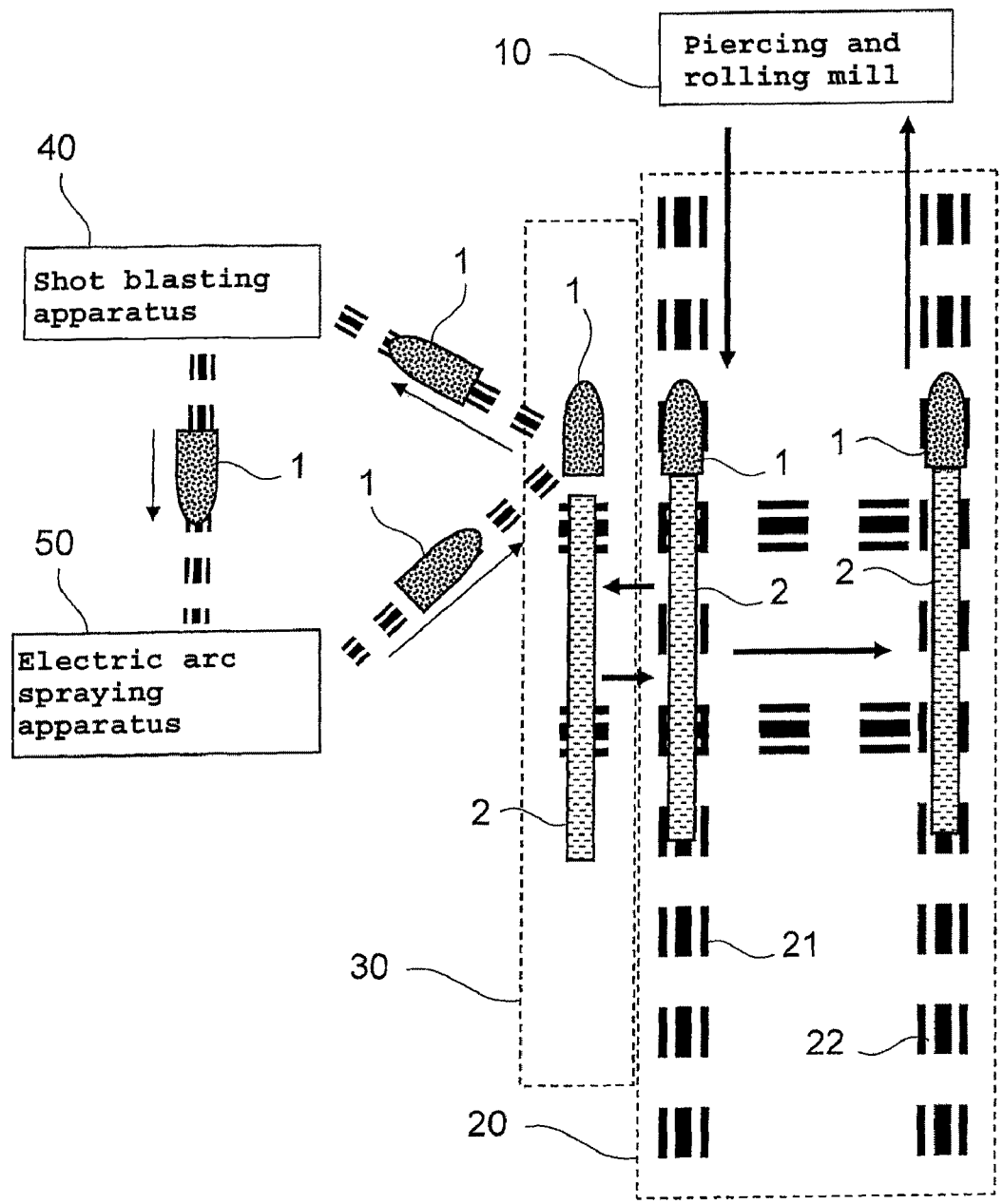
FIG. 11 is a schematic representation of the whole configuration of a regeneration equipment line for recycled use of the piercing and rolling plug according to the present invention.

FIG. 11 is a schematic representation of the whole configuration of the regeneration equipment line for recycled use of the piercing and rolling plug according to the present invention. As shown in the figure, the plug regeneration equipment line comprises: a mandrel delivery and receipt apparatus 20; a plug exchange apparatus 30; a shot blasting apparatus 40; and an electric arc spraying apparatus 50, whereby a sequential plug regeneration line is formed.

The mandrel delivery and receipt apparatus 20 is disposed in the vicinity of a piercing and rolling mill 10 in a Mannesmann pipe making equipment, which is operated continuously, and delivers a mandrel 2 with a plug 1 coated by electric arc spraying as mounted thereon to the piercing and rolling mill 10. This mandrel delivery and receipt apparatus 20 is equipped with two parallel lines 21 and 22 connected to the piercing and rolling mill 10. One of those lines, 21, is an extraction line for drawing out the plug 1 as used in piercing and rolling, together with the mandrel 2, from the piercing and rolling mill 10, and the other line 22 is a delivery line for delivering the mandrel 2 with the regenerated plug 1 mounted thereon to the piercing and rolling mill 10.

The plug exchange apparatus 30 is disposed so as to be adjacent to the extraction line 21 in the mandrel delivery and receipt apparatus 20, wherein the plug exchange apparatus 30: receives, from the extraction line 21, a mandrel 2 with an as-used plug 1 in piercing and rolling being mounted thereon; replaces the plug 1 on the received mandrel 2 with a regenerated plug 1 which is reclaimed during passing through the shot blasting apparatus 40 and the electric arc spraying apparatus 50; and further, sends the mandrel 2 with the regenerated plug 1 being mounted thereon to the delivery line 22.

The handling of the mandrel 2 in these steps is made by means of a kicker, a conveyor, a manipulator or the like. Here, the plug exchange apparatus 30 performs the plug replacement automatically, and a specific structure thereof is described later herein with reference to FIG. 12 and FIG. 13.

The shot blasting apparatus 40 is an apparatus for: receiving a plug 1 as used in piercing and rolling and demounted from a mandrel 2 in the plug exchange apparatus 30; and subjecting the surface of the plug 1 to shot blasting. The plug 1 as used in piercing and rolling is deprived of the film remaining on the plug surface by shot blasting as the first stage of regeneration. Here, the shot blasting apparatus 40 is automatically operated to perform shot blasting, and a specific structure thereof is described later herein with reference to FIG. 14.

The electric arc spraying apparatus 50 is an apparatus for: receiving the plug 1 deprived of the film in the shot blasting apparatus 40; re-forming a film on the exposed surface of the plug 1 by electric arc spraying using an iron wire; and delivering the thus-regenerated plug 1 to the plug exchange apparatus 30. The plug 1 after shot blasting is subjected to electric arc spraying as the second stage of regeneration, whereupon a film is re-formed on the plug surface to give a regenerated plug coated by electric arc spraying. Here, the electric arc spraying apparatus 50 is automatically operated to perform electric arc spraying, and a specific structure thereof is described later herein referring to FIG. 15.

The transfer of the plug 1 between the plug exchange apparatus 30 and the shot blasting apparatus 40, between the shot blasting apparatus 40 and electric art spraying apparatus 50, and between the electric arc spraying apparatus 50 and plug exchange apparatus 30 is made by means of a conveyor or the like.

Figure 12:
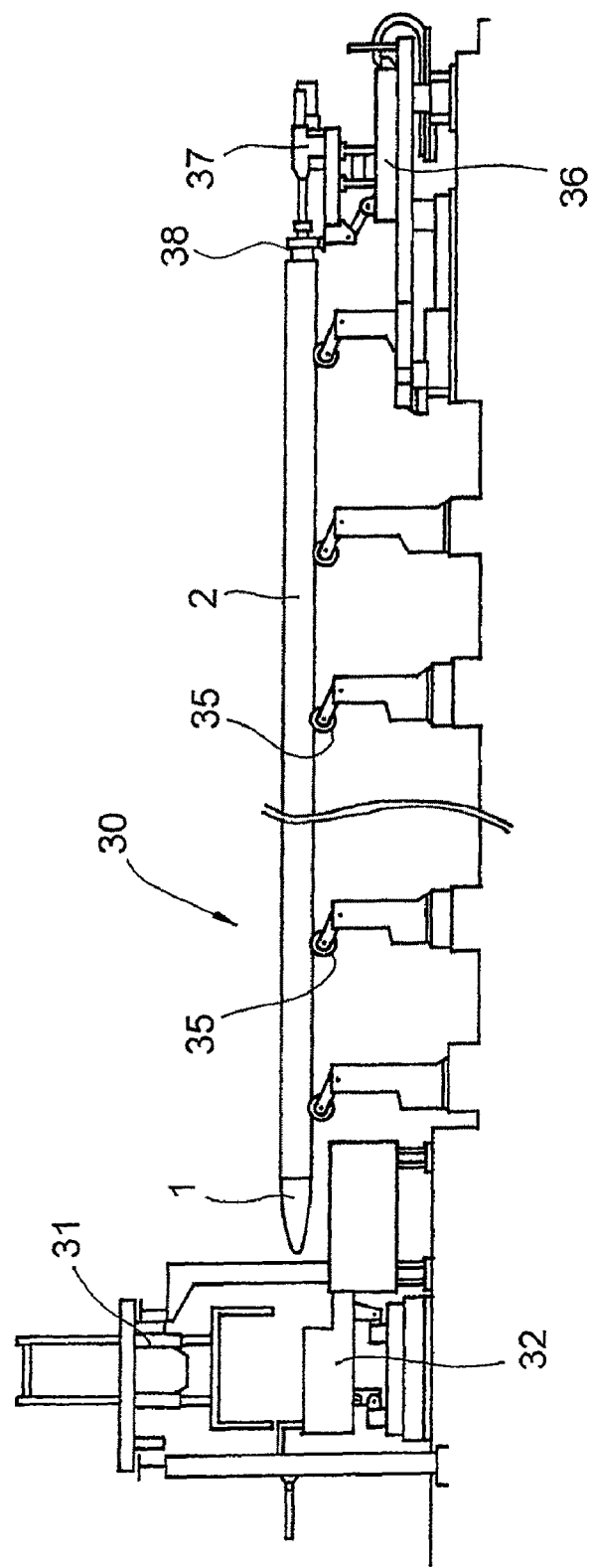
FIG. 12 is a side view illustrating the whole configuration of a plug exchange apparatus.
Figure 13:
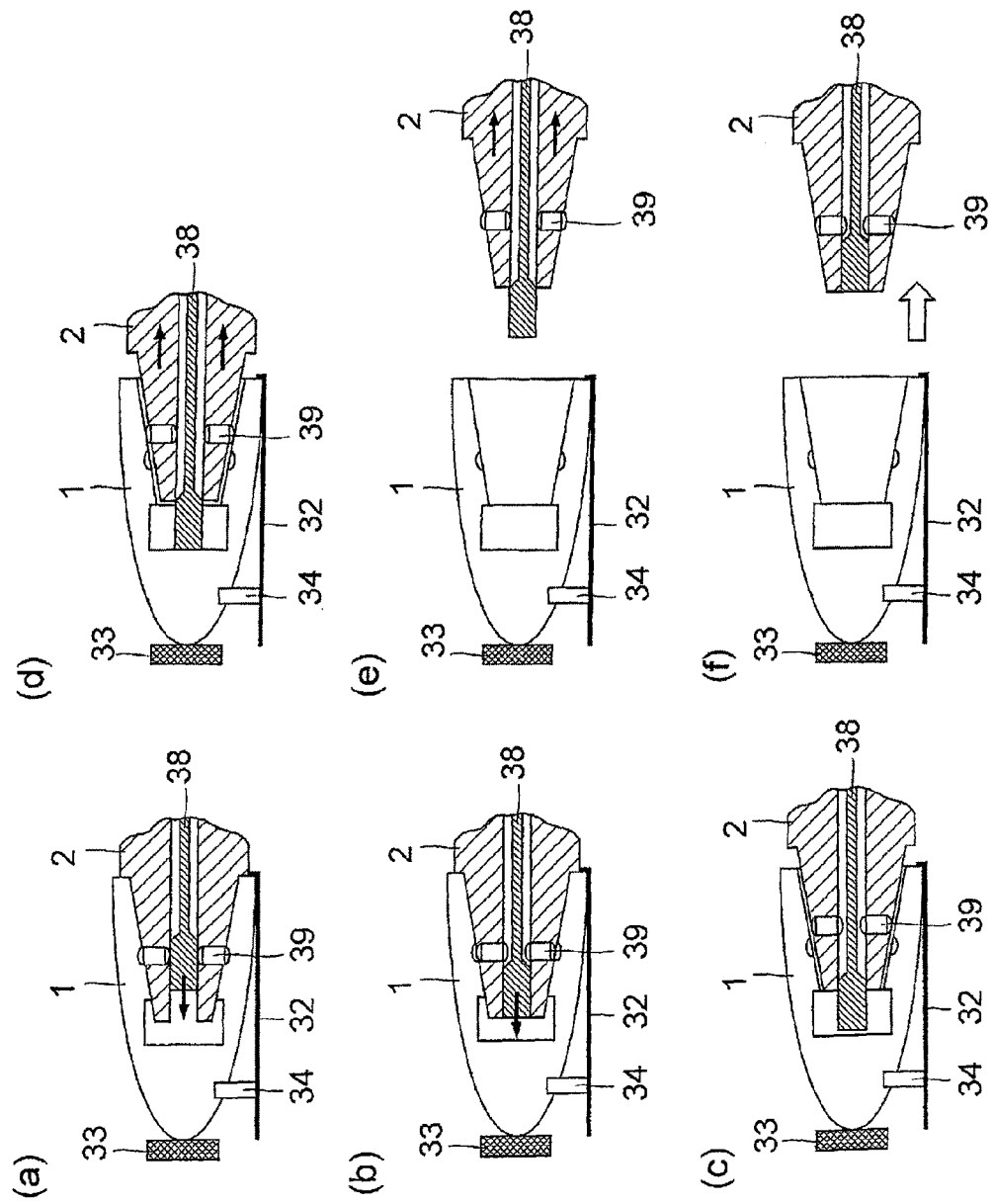
FIGS. 13(a) to 13(f) are sectional representations of essential parts for illustrating exemplary plug mounting and demounting mechanisms in the plug exchange apparatus.

FIG. 12 is a side view illustrating the whole configuration of the plug exchange apparatus. In front of the mandrel 2 with the plug 1 mounted thereon, there are disposed a plug manipulator 31 and a plug exchange table 32. The plug manipulator 31 plays its role in a manner such that it transfers an as-used plug 1 in piercing and rolling, which is demounted on the plug exchange table 32, onto a conveyor between the plug exchange apparatus 30 and the shot blasting apparatus 40, while allowing the regenerated plug 1 to be transferred from a conveyor between the electric arc spraying apparatus 50 and the plug exchange apparatus 30 to the plug exchange table 32 (cf. FIG. 11 referred above).

On the other hand, below the mandrel 2, there are disposed plug exchange rollers 35 for supporting the mandrel 2 over the whole length thereof in a manner enabling upping and downing thereof and supporting the mandrel 2 in a manner enabling the forward and backward movements thereof. Further, behind the mandrel 2, there is disposed a plug exchange conveyor 36 of transfer-bed cart type for the forward and backward movements of the mandrel 2 and, on this plug exchange conveyor 36 of the transfer-bed cart type, there is disposed a plug pusher 37 for moving an inner rod 38 provided with in the mandrel 2 for realizing the mounting or demounting of the plug 1.

FIGS. 13(a) to 13(f) are sectional representations of essential parts for illustrating exemplary plug mounting and demounting mechanisms in the plug exchange apparatus. The views show how an as-used plug 1 in piercing and rolling that is received from the extraction line 21 is demounted. As shown in FIG. 13(a), the mandrel 2 with the as-used plug 1 in piercing and rolling being mounted thereon is positioned on the plug exchange table 32 by means of a plug stopper 33 and thus placed in a predetermined position for plug replacement. On that occasion, the plug 1 is supported on the plug exchange table 32 by means of a cassette 34 and is fixed to the mandrel 2 by the pressing forces exerted by pins 39 to be ratcheted up by pushing the inner rod 38 within the mandrel.

Then, as shown in FIG. 13(b), the plug pusher 37 (FIG. 12) advances so that a tapered portion of the inner rod 38 gets to and moves away from the position of the pins 39, whereby the pressing forces of the pins 39 against the mandrel 2 reduce, making it possible to demount the plug 1. Thereafter, as shown in FIG. 13(c), the top of the inner rod 38 touches a bottom surface inside the plug 1, whereupon the position of the plug 1 is determined by the plug stopper 33 and inner rod 38.

Then, as shown in FIG. 13(d), the retracting movement of the mandrel 2 toward a stroke end is started, the stroke end being determined by the mandrel 2 and inner rod 38, and subsequently, as shown in FIG. 13(e), the mandrel 2, together with the inner rod 38, is moved backward to a retracted position. Then, as shown in FIG. 13(f), in preparation for mounting a next plug, the inner rod 38 is further moved backward to an intermediate position in which the pins 39 are not pushed up. The demounting of the as-used plug 1 in piercing and rolling is thus completed.

The mounting of the regenerated plug 1 on the mandrel 2 becomes possible by carrying out the steps shown in FIGS. 13(a) to 13(f) in the reverse order.

Figure 14:
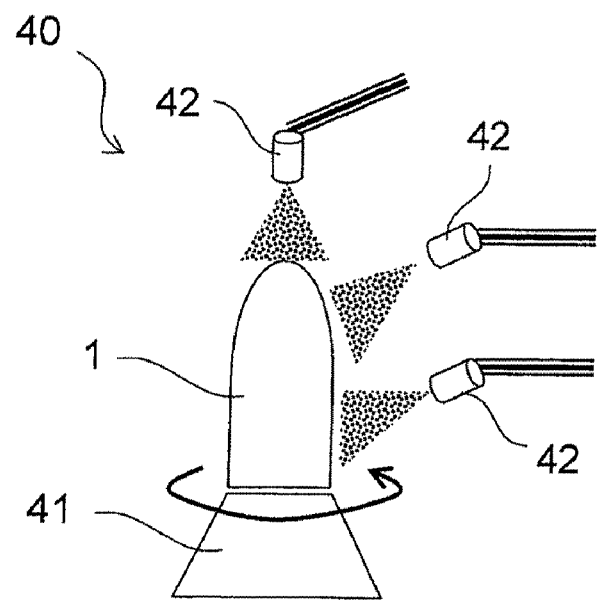
FIG. 14 is a side view illustrating the whole configuration of a shot blasting apparatus.

FIG. 14 is a side view illustrating the whole configuration of the shot blasting apparatus. There is disposed a shot turntable 41 revolving about a vertical axis, and the as-used plug 1 in piercing and rolling is vertically placed at the center of this shot turntable 41. On this occasion, the plug 1 is positioned by fitting a protruded member (not shown) standing in the middle of the shot turntable 41 into the mandrel insertion hole (not shown) opening on the rear end face of the plug. Around the shot turntable 41, there are disposed injection nozzles 42 for injecting blasting materials such as steel beads or alumina particles against the plug 1 by means of compressed air. In FIG. 14, there is shown a state of three injection nozzles 42 being disposed for injecting against the tip portion, the first half of the cylindrical portion and the latter half of the cylindrical portion (reeling portion) of the plug 1.

And, while the shot turntable 41 with the plug 1 being placed thereon is rotated, the blasting materials are injected from the injection nozzles 42, whereby the blasting particles are directed to the surface of the plug 1 at high speeds and the film remaining on the surface of the plug 1 can thus be removed exhaustively.

A length of time required for removing, by shot blasting, the as-used plug film in piercing and rolling generally depends on the number of injection nozzles 42 disposed. For example, in the case of one injection nozzle 42, it takes about 2 minutes; when there are two nozzles, about half that time, namely about 1 minute, is sufficient and, when there are three, about one third (⅓), namely about 40 seconds, is sufficient.

For reducing a length of time required for shot blasting, it is desirable that an increased number of injection nozzles 42 be disposed. Increasing the pressure for injecting blasting materials from each injection nozzle 42 or disposing an increased number of shot blasting apparatus is also effective in reducing a length of time required for shot blasting.

In the shot blasting apparatus shown in FIG. 14, the mounting or demounting of the plug 1 on or from the shot turntable 41 can be carried out using an articulated transfer robot.

Further, whereas the shot blasting apparatus of the type that injects the blasting material by means of compressed air is shown in FIG. 14, the apparatus may also be of the type injecting blasting materials by utilizing the centrifugal force exerted by a turbine wheel.

Figure 15:
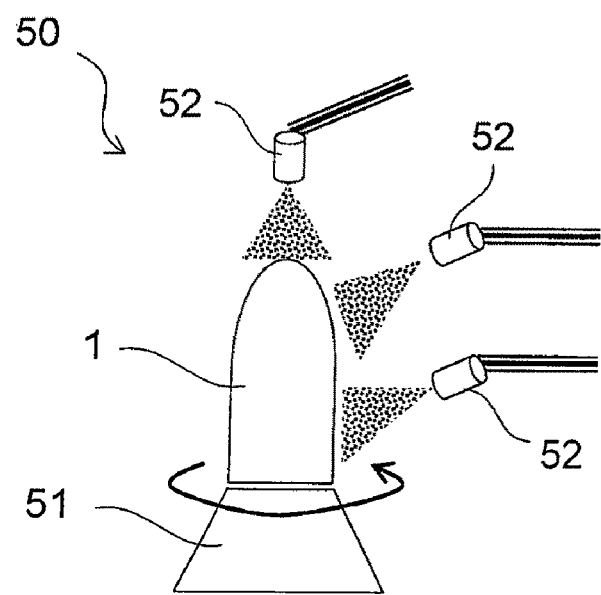
FIG. 15 is a side view illustrating the whole configuration of an electric arc spraying apparatus.

FIG. 15 is a side view illustrating the whole configuration of the electric arc spraying apparatus. There is disposed a spray turntable 51 revolving about a vertical axis, and the plug 1 after shot blasting is vertically placed at the center of this spray turntable 51. On this occasion, the plug 1 is positioned by fitting a protruded member (not shown), which stands at the center of the spray turntable 51, into the mandrel insertion hole on the rear end face of the plug.

Around the spray turntable 51, there are disposed spray nozzles 52 for spraying electric arc-melted spraying material (Fe in the case of an Fe type iron wire, or Fe and W in the case of a W-containing iron wire) against the plug 1 by means of compressed air or nitrogen gas. In FIG. 15, there is shown a state of three spray nozzles 52 being disposed for spraying against the tip portion, the first half of the cylindrical portion and the latter half of the cylindrical portion (reeling portion) of the plug 1.

And, while the spray turntable 51 with the plug 1 being placed thereon is rotated, the spraying material is sprayed from the spray nozzles 52, whereby the surface of the plug 1 is sprayed with the spraying material. On this occasion, the spray nozzles 52 each can be properly moved by means of an articulated arm, and a film composed of oxides and Fe can be re-formed all over the surface of the plug 1. Further, while injecting the spraying materials, the spray nozzles 52 can be moved individually so as to be gradually distanced from the plug 1.

A length of time required for film formation by electric arc spraying generally depends on the number of spray nozzles 52 disposed. For example, in the case of one spray nozzle 52, it takes about 3 minutes; when there are two nozzles, about half that time, namely about 1.5 minutes, is sufficient and, when there are three, about one third (⅓), namely about 1 minute, is sufficient; thus, a length of time for the treatment can be reduced as compared with that required for scale film formation by heat treatment.

For reducing a length of time required for electric arc spraying, it is desirable to increase the number of spray nozzles 52 to be disposed. It is also effective in reducing a length of time required for electric arc spraying to increase the number of electric arc spraying apparatus itself.

In the electric arc spraying apparatus shown in FIG. 15, the mounting or demounting of the plug 1 on or from the spray turntable 51 can be carried out using an articulated transfer robot.

By using the plug regeneration equipment line having such a configuration as mentioned above, it is possible, in plug regeneration, to subject the plug surface to shot blasting to remove the remaining film and then re-form a film on the thus-exposed plug surface by electric arc spraying using an iron wire.

Although, on that occasion, a length of time for shot blasting for film removal and a length of time for electric arc spraying in order to re-form a film are required for plug regeneration, a total length of time can be markedly reduced as compared with that required for scale film formation by heat treatment.

Therefore, the as-used plug in piercing and rolling can be regenerated in a short period of time for recycling use in piercing and rolling; thus, even when the number of plugs is small, the production efficiency of the piercing and rolling mill can be sufficiently secured. In addition, electric arc spraying can be carried out on an apparatus, which is simple in configuration, using an inexpensive spraying material wire and, therefore, can be carried out at low cost.

Further, the above-mentioned plug regeneration equipment line can be provided to be independent of the rolling line in which workpieces run in the piercing and rolling mill in a continuously operated Mannesmann pipe making plant, constituting as an automated plug regeneration line for plug regeneration and exchange in a short period of time. Therefore, the above-mentioned plug regeneration equipment line makes it possible to regenerate piercing and rolling plugs and use them in a recycled manner while matching with the efficiency of the whole process for producing seamless steel pipes.

When it is desired to employ a configuration such that a lubricant layer is formed on the plug surface with a film re-formed thereon, a lubricant spraying apparatus can be disposed along the plug transfer path between the electric arc spraying apparatus 50 and plug exchange apparatus 30.

Figure 16:
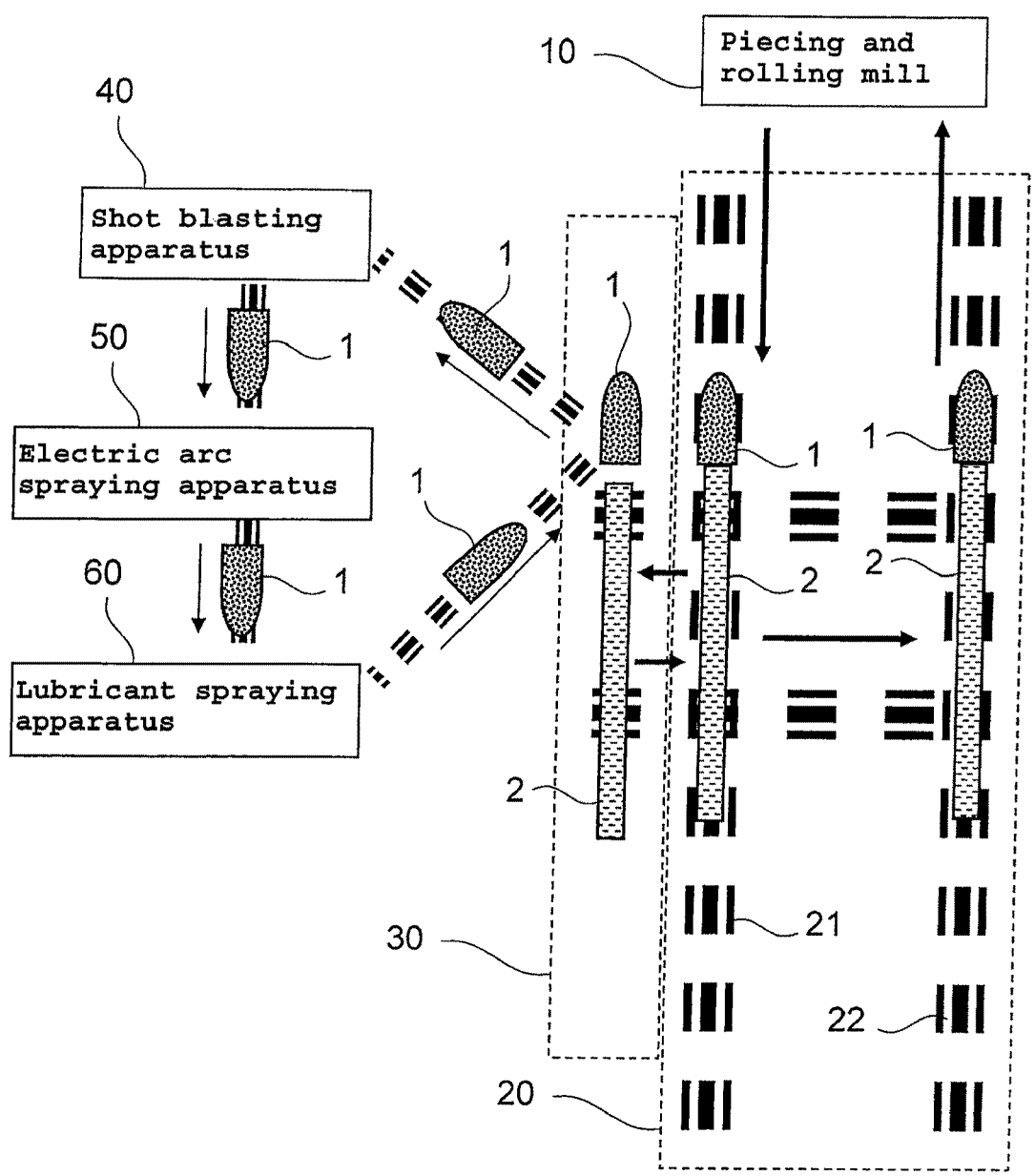
FIG. 16 is a schematic representation of the whole configuration of a plug regeneration equipment line where a lubricant spraying apparatus is disposed.

FIG. 16 is a schematic representation of the whole configuration of the plug regeneration equipment line where the lubricant spraying apparatus is disposed. As shown in that figure, the lubricant spraying apparatus 60 is to: receive the plug 1 with a film re-formed in the electric arc spraying apparatus 50; form a lubricant layer on the film surface of the plug 1; and deliver this plug 1 to the plug exchange apparatus 30.

Figure 17:
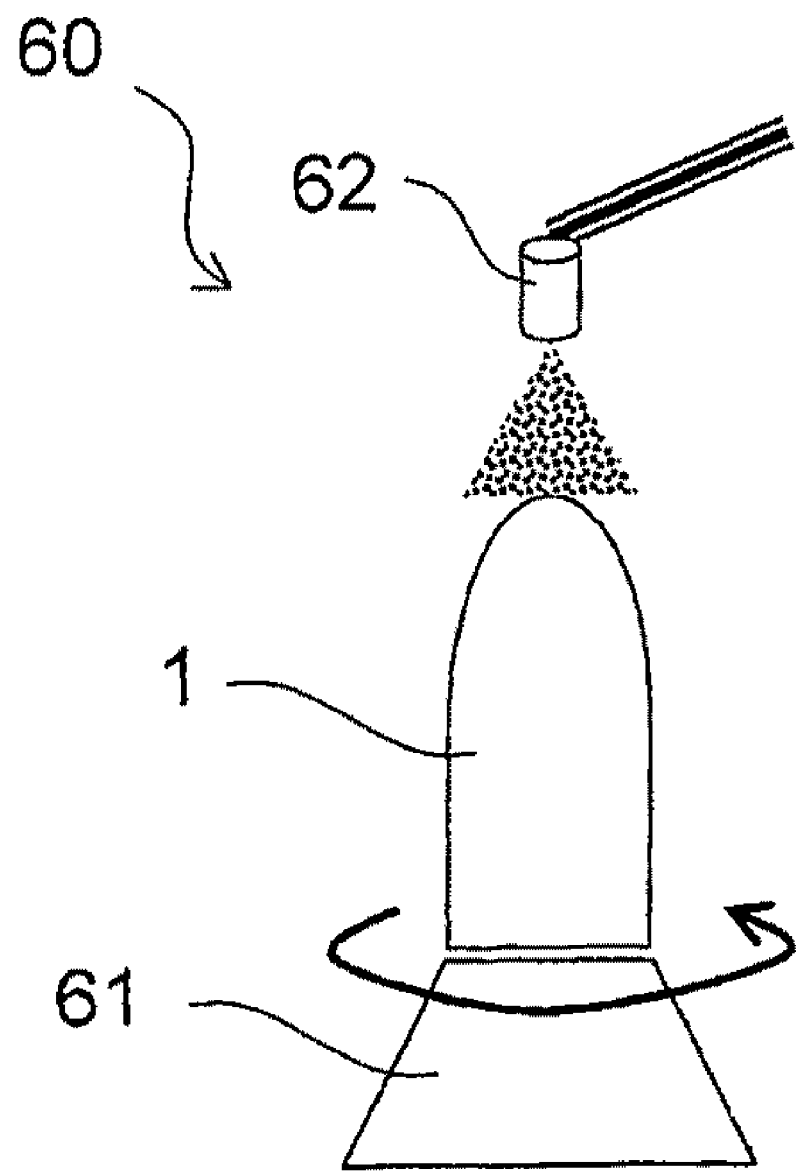
FIG. 17 is a side view illustrating the whole configuration of the lubricant spraying apparatus.

FIG. 17 is a side view illustrating the whole configuration of the lubricant spraying apparatus. In the lubricant spraying apparatus 60, there is disposed a spray turntable 61 revolving about a vertical axis, and the plug 1 after electric arc spraying is vertically placed at the center of this spray turntable 61. On this occasion, the plug 1 is positioned by fitting a protruded member (not shown) standing at the center of the spray turntable 61 into the mandrel insertion hole on the rear end face of the plug. Around the spray turntable 61, there is disposed a spray nozzle 62 for spraying a lubricant in the form of mist against the plug 1 by means of a compressed gas. In FIG. 17, there is shown a state of a single spray nozzle 62 being disposed for spraying against the tip portion of the plug 1.

And, while the spray turntable 61 with the plug 1 placed thereon is rotated, the lubricant is sprayed from the spray nozzle 62, whereby the film surface of the plug 1 can be further coated with a lubricant layer. In cases where the lubricant contains water, it is desirable that the lubricant after spraying be dried by hot air, for instance.

Figure 18:
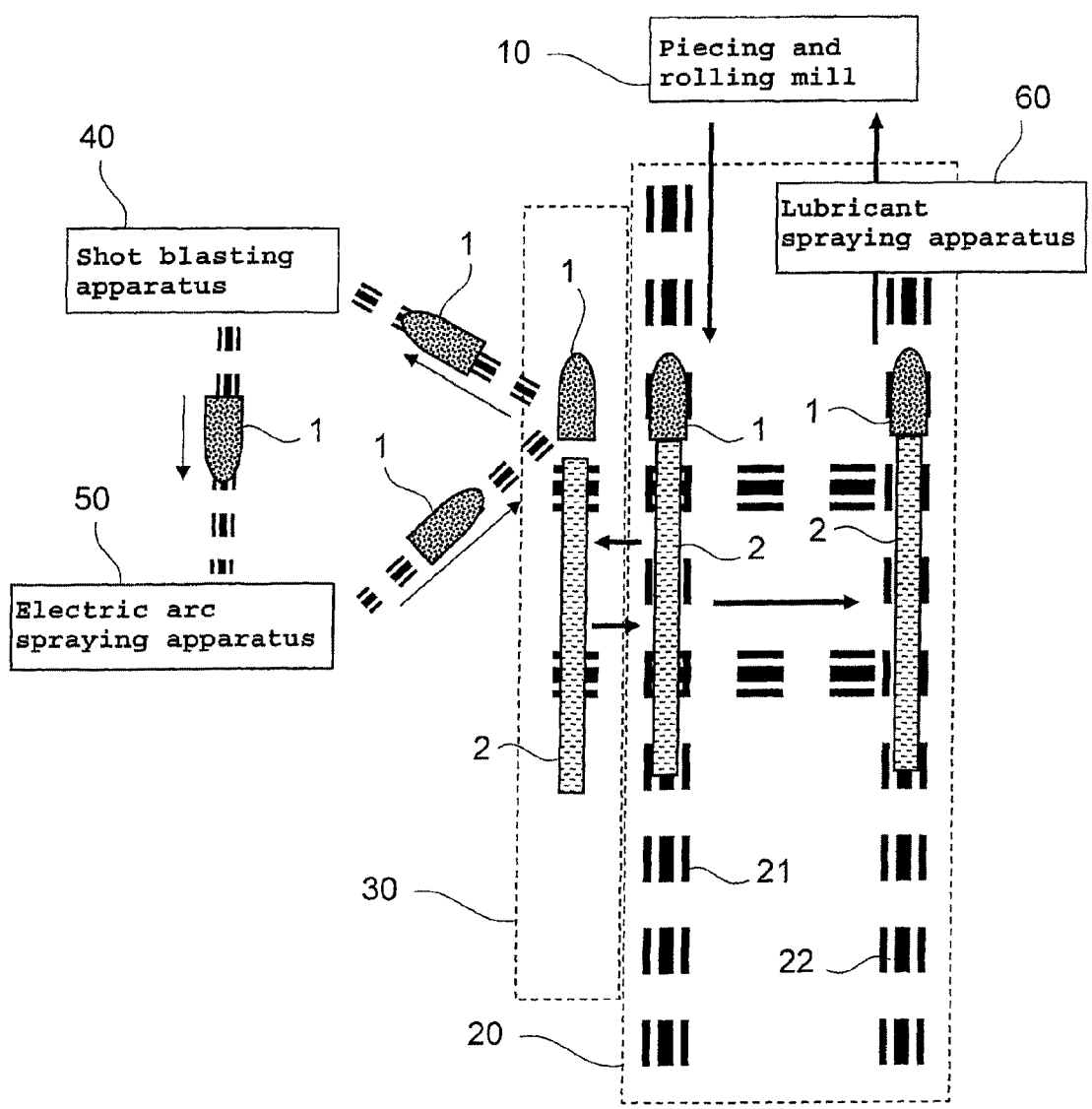
FIG. 18 is a schematic representation of the whole configuration of another plug regeneration equipment line where the lubricant spraying apparatus is disposed.

FIG. 18 is a schematic representation of the whole configuration of another plug regeneration equipment line where the lubricant spraying apparatus is disposed. In the plug regeneration equipment line shown in that view, the lubricant spraying apparatus 60 is disposed in the delivery line 22, which is for delivering from the mandrel delivery and receipt apparatus 20 to the piercing and rolling mill 10. In this case, the plug 1 as mounted on the mandrel 2 can be layered with a lubricant on the film surface thereof by the lubricant spraying using the lubricant spraying apparatus 60 (spray nozzle 62 in FIG. 17) during transferring the mandrel 2 with the film re-coated plug 1 being mounted thereon along the delivery line 22.

The scope of the present invention is not limited to the above-mentioned embodiments but various modifications can be made without departing from the spirit of the present invention. For example, while the regeneration and recycling use of the as-used plug in piercing and rolling has been described hereinabove, a newly prepared plug can also be used in piercing and rolling for recycling use thereof in the same manner. In addition, as for the method of spraying, not only the technique of electric arc spraying but also the technique of wire flame spraying can be applied.

In the above-mentioned embodiments, the regeneration equipment line for recycling use of the piercing and rolling plug has a configuration such that the plug is demounted from the mandrel and the plug alone is subjected to plug regeneration treatment steps such as shot blasting, electric arc spraying and, further, optional lubricant spraying. Nonetheless, this could be configured such that the plug together with the mandrel, without demounting of the plug from the mandrel, is subjected to regeneration treatment.

INDUSTRIAL APPLICABILITY

The piercing and rolling plug according to the present invention, which has a film composed of oxides and Fe as formed on the plug surface, is excellent in heat-shielding and seizure-preventing abilities and, further, the lifetime of the plug can be prolonged and, in addition, the film can be formed and regenerated at low cost and in a short period of time since it is formed by electric arc spraying.

Further, according to the method of regenerating the piercing and rolling plug of the present invention, the coated plug can be regenerated at low cost and in a short period of time since the film composed of oxides and Fe is re-formed on the plug surface via the steps of: shot blasting of the as-used plug in piercing and rolling; and electric arc spraying, being in that order.

Furthermore, the equipment line for regenerating the piercing and rolling plug according to the present invention can serve as an automated serial regeneration line for regenerating and replacing plugs in a short period of time for recycled use thereof, making on-line plug regeneration possible without affecting the efficiency of the whole process of seamless steel pipe production. Thus, the present invention is very useful in the production of high alloy steel seamless pipes.

What is claimed is:

1. A method for making a piercing and rolling plug for recycled use in a piercing and rolling mill to be employed in a seamless steel pipe production, the method comprising the steps of:
    applying shot-blasting on the surface of said plug; and
    forming a film on the surface of said plug thus shot-blasted by electric arc spraying by use of an iron wire in such a manner that the spray nozzle is gradually distanced from the surface to be sprayed, thereby forming a film composed of oxides and Fe and comprises higher levels of oxides on a surface layer side than on the base metal side.

2. The method for making a piercing and rolling plug according to claim 1, wherein the film comprises not more than 40% oxides in an adjacent portion to the base metal surface and 55 to 80% oxides in a surface layer portion.

3. The method for making a piercing and rolling plug according to claim 1, wherein the plug has a bullet-like shape comprising a tip portion and a cylindrical portion wherein the thickness of the film in the tip portion thereof is heavier than that in the cylindrical portion thereof.

4. The method for making a piercing and rolling plug according to claim 2, wherein the plug has a bullet-like shape comprising a tip portion and a cylindrical portion wherein the thickness of the film in the tip portion thereof is heavier than that in the cylindrical portion thereof.

5. The method for making a piercing and rolling plug according to claim 1, further comprising the step of forming a lubricant layer on the surface of the film.

6. The method for making a piercing and rolling plug according to claim 2 further comprising the step of forming a lubricant layer on the surface of the film.

7. The method for making a piercing and rolling plug according to claim 3 further comprising the step of forming a lubricant layer on the surface of the film.

8. The method for making a piercing and rolling plug according to claim 4 further comprising the step of forming a lubricant layer on the surface of the film.

9. The method for making a piercing and rolling plug according to claim 1, wherein the iron wire contains W.

10. The method for making a piercing and rolling plug according to claim 2, wherein the iron wire contains W.

11. The method for making a piercing and rolling plug according to claim 3, wherein the iron wire contains W.

12. The method for making a piercing and rolling plug according to claim 4, wherein the iron wire contains W.

13. A method of regenerating the piercing and rolling plug produced according to claim 1 for recycled use thereof, the method comprising the steps of:
   applying shot-blasting on the surface of said plug to remove an as-used plug film in piercing and rolling; and
   newly forming a film on the surface of said plug thus shot-blasted by electric arc spraying by use of an iron wire in such a manner that the spray nozzle is gradually distanced from the surface to be sprayed, thereby forming a new film which is composed of oxides and Fe, and comprises higher levels of oxides on a surface layer side than on the base metal side.

14. The method of regenerating the piercing and rolling plug according to claim 13, wherein the removal of the film by shot blasting and a new film formation by electric arc spraying are carried out only in the tip portion of the plug of bullet-like shape.

15. The method of regenerating the piercing and rolling plug according to claim 13, wherein the film comprises not more than 40% oxides in an adjacent portion to the base metal surface and 55 to 80% oxides in a surface layer portion.

16. The method of regenerating the piercing and rolling plug according to claim 13, wherein the plug has a bullet-like shape comprising a tip portion and a cylindrical portion wherein the thickness of the film in the tip portion thereof is heavier than that in the cylindrical portion thereof.

17. The method of regenerating the piercing and rolling plug according to claim 13, further comprising the step of forming a lubricant layer on the surface of the film.

18. The method of regenerating the piercing and rolling plug according to claim 13, wherein the iron wire contains W.

19. An equipment line for regenerating a piercing and rolling plug for recycled use on a piercing and rolling mill to be employed in seamless steel pipe production, the equipment line comprising:
   a mandrel delivery and receipt apparatus for delivering a mandrel with the plug being mounted thereon and recovering the mandrel after use in piercing and rolling;
   a plug exchange apparatus for receiving the mandrel after use in piercing and rolling from the mandrel delivery and receipt apparatus and delivering the mandrel to the mandrel delivery and receipt apparatus after replacement of the regenerated plug for the as-used plug in piercing and rolling;
   a shot blasting apparatus for receiving the as-used plug in piercing and rolling from the plug exchange apparatus and subjecting the surface of the as-used plug in piercing and rolling to shot blasting; and
   an electric arc spraying apparatus for receiving the plug treated in the shot blasting apparatus; regenerating the plug by electric arc spraying by use of an iron wire in such a manner that the spray nozzle is gradually distanced from the surface to be sprayed, thereby forming a film which is composed of oxides and Fe, and comprises higher levels of oxides on a surface layer side than on the base metal side; and delivering the thus-regenerated plug to the plug exchange apparatus,
   wherein, being arranged in above order and in these apparatuses so arranged, the as-used plugs in piercing and rolling are successively replaced each with the regenerated plug to be mounted on the mandrel and fed to the piercing and rolling mill, which is performed in a repeated manner.

20. The equipment line for regenerating a piercing and rolling plug according to claim 19, further comprising a lubricant spraying apparatus for applying a lubricant on the surface of the regenerated plug along the path where delivering the mandrel with the regenerated plug being mounted thereon from the mandrel delivery and receipt apparatus to the piercing and rolling mill is performed.

* * * * *